(12) United States Patent
Takayama

(10) Patent No.: US 7,023,486 B2
(45) Date of Patent: Apr. 4, 2006

(54) VIDEO SIGNAL PROCESSING DEVICE AND METHOD

(75) Inventor: Masamichi Takayama, Tokyo (JP)

(73) Assignee: Sony Corporation, Tokyo (JP)

( * ) Notice: Subject to any disclaimer, the term of this patent is extended or adjusted under 35 U.S.C. 154(b) by 581 days.

(21) Appl. No.: 10/089,962

(22) PCT Filed: Aug. 10, 2001

(86) PCT No.: PCT/JP01/06950

§ 371 (c)(1),
(2), (4) Date: Aug. 9, 2002

(87) PCT Pub. No.: WO02/15575

PCT Pub. Date: Feb. 21, 2002

(65) Prior Publication Data

US 2003/0031461 A1     Feb. 13, 2003

(30) Foreign Application Priority Data

Aug. 10, 2000  (JP)  .............................. 2000-247941

(51) Int. Cl.
*H04N 7/00* (2006.01)
*H04N 11/20* (2006.01)

(52) U.S. Cl. ...................... 348/441; 348/478; 348/459; 386/55; 386/65

(58) Field of Classification Search ................. 348/441, 348/445, 459, 460, 465, 467, 473, 474, 476, 348/722, 478, 605; 386/55, 65
See application file for complete search history.

(56) References Cited

U.S. PATENT DOCUMENTS 5,115,311 A    5/1992  Jaqua 5,857,044 A *  1/1999  Ogawa et al. ................ 386/62
5,956,090 A *  9/1999  Yamauchi .................... 348/441
6,345,143 B1 * 2/2002  Kanda ......................... 386/52

FOREIGN PATENT DOCUMENTS

| EP | 0 588 669 | 3/1994 |
| JP | 9-168148 | 6/1997 |
| JP | 9-181967 | 7/1997 |
| WO | WO 94 01971 | 1/1994 |
| WO | WO 98 12864 | 3/1998 |
| WO | WO 00 13418 | 3/2000 |

OTHER PUBLICATIONS

Kary M L: "Video-Assisted Film Editing System" Jun. 1982, SMPTE Journal, SMPTE Inc. Scarsdale, N. Y., US, Page(s) 547-551 XP002262388 ISSN:0036-1682.

* cited by examiner

*Primary Examiner*—Michael H. Lee
(74) *Attorney, Agent, or Firm*—Frommer Lawrence & Haug LLP; William S. Frommer; Thomas F. Presson

(57) ABSTRACT

A source original HD video signal S1 of 24-frame rate is subjected to 2-3 pull-down process, thereby generating a 30-frame rate SD video signal S5. The 24-frame rate time code added to the source video signal S1 is described in the user area of the VITC data (201) inserted into the 30-frame rate video signal. The sequence number 301 indicating the order of fields in one sequence of the pull-down process is described in the user area of the VITC data (201) inserted in the 30-frame rate video signal. Inverse 2-3 pull-down process is performed on the 30-frame rate video signal recorded on tape, by using the sequence number 301 described in the user area of the VITC data, thereby generating a 24-frame rate video signal. The 24-frame rate video signal is recorded on a hard disc. A nonlinear editing device (19) uses the 24-frame rate time code inserted in the user area of the VITC data, thereby generating an edition list that will be supplied to an on-line editing system.

21 Claims, 24 Drawing Sheets

| VITC BIT No. | SMPTE 12M |
| --- | --- |
| 0 | VITC SYNC BIT(1) |
| 1 | VITC SYNC BIT(0) |
| 2 | TV FRAME UNITS(1) |
| 3 | TV FRAME UNITS(2) |
| 4 | TV FRAME UNITS(4) |
| 5 | TV FRAME UNITS(8) |
| 6 | 1st BINARY GROUP(LSB) |
| 7 | 1st BINARY GROUP |
| 8 | 1st BINARY GROUP |
| 9 | 1st BINARY GROUP(MSB) |
| 10 | VITC SYNC BIT(1) |
| 11 | VITC SYNC BIT(0) |
| 12 | TV FRAME TENS(1) |
| 13 | TV FRAME TENS(2) |
| 14 | DROP FRAME FLAG |
| 15 | COLOR FRAME FLAG |
| 16 | 2nd BINARY GROUP(LSB) |
| 17 | 2nd BINARY GROUP |
| 18 | 2nd BINARY GROUP |
| 19 | 2nd BINARY GROUP(MSB) |
| 20 | VITC SYNC BIT(1) |
| 21 | VITC SYNC BIT(0) |
| 22 | TV SECONDS UNITS(1) |
| 23 | TV SECONDS UNITS(2) |
| 24 | TV SECONDS UNITS(4) |
| 25 | TV SECONDS UNITS(8) |
| 26 | 3rd BINARY GROUP(LSB) |
| 27 | 3rd BINARY GROUP |
| 28 | 3rd BINARY GROUP |
| 29 | 3rd BINARY GROUP(MSB) |
| 30 | VITC SYNC BIT(1) |
| 31 | VITC SYNC BIT(0) |
| 32 | TV SECONDS TENS(1) |
| 33 | TV SECONDS TENS(2) |
| 34 | TV SECONDS TENS(4) |
| 35 | FIELD/PHASE FLAG |
| 36 | 4th BINARY GROUP(LSB) |
| 37 | 4th BINARY GROUP |
| 38 | 4th BINARY GROUP |
| 39 | 4th BINARY GROUP(MSB) |

FIG.5

| VITC BIT No. | SMPTE 12M |
|---|---|
| 40 | VITC SYNC BIT(1) |
| 41 | VITC SYNC BIT(0) |
| 42 | TV MINUTES UNITS(1) |
| 43 | TV MINUTES UNITS(2) |
| 44 | TV MINUTES UNITS(4) |
| 45 | TV MINUTES UNITS(8) |
| 46 | 5th BINARY GROUP(LSB) |
| 47 | 5th BINARY GROUP |
| 48 | 5th BINARY GROUP |
| 49 | 5th BINARY GROUP(MSB) |
| 50 | VITC SYNC BIT(1) |
| 51 | VITC SYNC BIT(0) |
| 52 | TV MINUTES TENS(1) |
| 53 | TV MINUTES TENS(2) |
| 54 | TV MINUTES TENS(4) |
| 55 | BINARY GROUP FLAG 0 |
| 56 | 6th BINARY GROUP(LSB) |
| 57 | 6th BINARY GROUP |
| 58 | 6th BINARY GROUP |
| 59 | 6th BINARY GROUP(MSB) |
| 60 | VITC SYNC BIT(1) |
| 61 | VITC SYNC BIT(0) |
| 62 | TV HOURS UNITS(1) |
| 63 | TV HOURS UNITS(2) |
| 64 | TV HOURS UNITS(4) |
| 65 | TV HOURS UNITS(8) |
| 66 | 7th BINARY GROUP(LSB) |
| 67 | 7th BINARY GROUP |
| 68 | 7th BINARY GROUP |
| 69 | 7th BINARY GROUP(MSB) |
| 70 | VITC SYNC BIT(1) |
| 71 | VITC SYNC BIT(0) |
| 72 | TV HOURS TENS(1) |
| 73 | TV HOURS TENS(2) |
| 74 | BINARY GROUP FLAG 1 |
| 75 | BINARY GROUP FLAG 2 |
| 76 | 8th BINARY GROUP(LSB) |
| 77 | 8th BINARY GROUP |
| 78 | 8th BINARY GROUP |
| 79 | 8th BINARY GROUP(MSB) |
| 80 | VITC SYNC BIT(1) |
| 81 | VITC SYNC BIT(0) |
| 82 | VITC CRCC CODE |

FIG.6

| VITC BIT No. | |
|---|---|
| 0 | VITC SYNC BIT(1) |
| 1 | VITC SYNC BIT(0) |
| 2 | 24F TV FRAME UNITS |
| 3 | 24F TV FRAME UNITS |
| 4 | 24F TV FRAME UNITS |
| 5 | 24F TV FRAME UNITS |
| 6 | 1st BINARY GROUP |
| 7 | 1st BINARY GROUP |
| 8 | 1st BINARY GROUP |
| 9 | 1st BINARY GROUP |
| 10 | VITC SYNC BIT(1) |
| 11 | VITC SYNC BIT(0) |
| 12 | 24F TV FRAME TENS(1) |
| 13 | 24F TV FRAME TENS(2) |
| 14 | 24F DROP FRAME FLAG |
| 15 | 24F COLOR FRAME FLAG |
| 16 | 2nd BINARY GROUP |
| 17 | 2nd BINARY GROUP |
| 18 | 2nd BINARY GROUP |
| 19 | 2nd BINARY GROUP |
| 20 | VITC SYNC BIT(1) |
| 21 | VITC SYNC BIT(0) |
| 22 | 24F TV SECONDS UNITS(1) |
| 23 | 24F TV SECONDS UNITS(2) |
| 24 | 24F TV SECONDS UNITS(4) |
| 25 | 24F TV SECONDS UNITS(8) |
| 26 | 3rd BINARY GROUP |
| 27 | 3rd BINARY GROUP |
| 28 | 3rd BINARY GROUP |
| 29 | 3rd BINARY GROUP |
| 30 | VITC SYNC BIT(1) |
| 31 | VITC SYNC BIT(0) |
| 32 | 24F TV SECONDS TENS(1) |
| 33 | 24F TV SECONDS TENS(2) |
| 34 | 24F TV SECONDS TENS(4) |
| 35 | 24F FIELD/PHASE FLAG |
| 36 | 4th BINARY GROUP |
| 37 | 4th BINARY GROUP |
| 38 | 4th BINARY GROUP |
| 39 | 4th BINARY GROUP |

| | VITC BIT No. | |
|---|---|---|
| 103-5 | 40 | VITC SYNC BIT(1) |
| | 41 | VITC SYNC BIT(0) |
| 109-1 | 42 | 24F TV MINUTES UNITS(1) |
| | 43 | 24F TV MINUTES UNITS(2) |
| | 44 | 24F TV MINUTES UNITS(4) |
| | 45 | 24F TV MINUTES UNITS(8) |
| 113-5 | 46 | 5th BINARY GROUP |
| | 47 | 5th BINARY GROUP |
| | 48 | 5th BINARY GROUP |
| | 49 | 5th BINARY GROUP |
| 103-6 | 50 | VITC SYNC BIT(1) |
| | 51 | VITC SYNC BIT(0) |
| 109-2 | 52 | 24F TV MINUTES TENS(1) |
| | 53 | 24F TV MINUTES TENS(2) |
| | 54 | 24F TV MINUTES TENS(4) |
| | 55 | BINARY GROUP FLAG 0 |
| 113-6 | 56 | 6th BINARY GROUP |
| | 57 | 6th BINARY GROUP |
| | 58 | 6th BINARY GROUP |
| | 59 | 6th BINARY GROUP |
| 103-7 | 60 | VITC SYNC BIT(1) |
| | 61 | VITC SYNC BIT(0) |
| 111-1 | 62 | 24F TV HOURS UNITS(1) |
| | 63 | 24F TV HOURS UNITS(2) |
| | 64 | 24F TV HOURS UNITS(4) |
| | 65 | 24F TV HOURS UNITS(8) |
| 113-7 | 66 | 7th BINARY GROUP |
| | 67 | 7th BINARY GROUP |
| | 68 | 7th BINARY GROUP |
| | 69 | 7th BINARY GROUP |
| 103-8 | 70 | VITC SYNC BIT(1) |
| | 71 | VITC SYNC BIT(0) |
| 111-2 | 72 | 24F TV HOURS TENS(1) |
| | 73 | 24F TV HOURS TENS(2) |
| | 74 | BINARY GROUP FLAG 1 |
| | 75 | BINARY GROUP FLAG 2 |
| 113-8 | 76 | 8th BINARY GROUP |
| | 77 | 8th BINARY GROUP |
| | 78 | 8th BINARY GROUP |
| | 79 | 8th BINARY GROUP |
| 103-9 | 80 | VITC SYNC BIT(1) |
| | 81 | VITC SYNC BIT(0) |
| | 82 | VITC CRCC CODE |

151

| VITC BIT No. | |
|---|---|
| 0 | VITC SYNC BIT(1) |
| 1 | VITC SYNC BIT(0) |
| 2 | 30F TV FRAME UNITS(1) |
| 3 | 30F TV FRAME UNITS(2) |
| 4 | 30F TV FRAME UNITS(4) |
| 5 | 30F TV FRAME UNITS(8) |
| 6 | 24F TV FRAME UNITS(1) |
| 7 | 24F TV FRAME UNITS(2) |
| 8 | 24F TV FRAME UNITS(4) |
| 9 | 24F TV FRAME UNITS(8) |
| 10 | VITC SYNC BIT(1) |
| 11 | VITC SYNC BIT(0) |
| 12 | 30F TV FRAME TENS(1) |
| 13 | 30F TV FRAME TENS(2) |
| 14 | 30F DROP FRAME FLAG |
| 15 | 30F COLOR FRAME FLAG |
| 16 | 24F TV FRAME TENS(1) |
| 17 | 24F TV FRAME TENS(2) |
| 18 | SPEAR |
| 19 | SPEAR |
| 20 | VITC SYNC BIT(1) |
| 21 | VITC SYNC BIT(0) |
| 22 | 30F TV SECONDS UNITS(1) |
| 23 | 30F TV SECONDS UNITS(2) |
| 24 | 30F TV SECONDS UNITS(4) |
| 25 | 30F TV SECONDS UNITS(8) |
| 26 | 24F TV SECONDS UNITS(1) |
| 27 | 24F TV SECONDS UNITS(2) |
| 28 | 24F TV SECONDS UNITS(4) |
| 29 | 24F TV SECONDS UNITS(8) |
| 30 | VITC SYNC BIT(1) |
| 31 | VITC SYNC BIT(0) |
| 32 | 30F TV SECONDS TENS(1) |
| 33 | 30F TV SECONDS TENS(2) |
| 34 | 30F TV SECONDS TENS(4) |
| 35 | 30F FIELD/PHASE FLAG |
| 36 | 24F TV SECONDS TENS(1) |
| 37 | 24F TV SECONDS TENS(2) |
| 38 | 24F TV SECONDS TENS(4) |
| 39 | Pull Down Sequence bit 0 → d0 |

FIG.9

| VITC BIT No. | |
|---|---|
| 40 | VITC SYNC BIT(1) |
| 41 | VITC SYNC BIT(0) |
| 42 | 30F TV MINUTES UNITS(1) |
| 43 | 30F TV MINUTES UNITS(2) |
| 44 | 30F TV MINUTES UNITS(4) |
| 45 | 30F TV MINUTES UNITS(8) |
| 46 | 24F TV MINUTES UNITS(1) |
| 47 | 24F TV MINUTES UNITS(2) |
| 48 | 24F TV MINUTES UNITS(4) |
| 49 | 24F TV MINUTES UNITS(8) |
| 50 | VITC SYNC BIT(1) |
| 51 | VITC SYNC BIT(0) |
| 52 | 30F TV MINUTES TENS(1) |
| 53 | 30F TV MINUTES TENS(2) |
| 54 | 30F TV MINUTES TENS(4) |
| 55 | BINARY GROUP FLAG 0 |
| 56 | 24F TV MINUTES TENS(1) |
| 57 | 24F TV MINUTES TENS(2) |
| 58 | 24F TV MINUTES TENS(4) |
| 59 | Pull Down Sequence bit 1 → d1 |
| 60 | VITC SYNC BIT(1) |
| 61 | VITC SYNC BIT(0) |
| 62 | 30F TV HOURS UNITS(1) |
| 63 | 30F TV HOURS UNITS(2) |
| 64 | 30F TV HOURS UNITS(4) |
| 65 | 30F TV HOURS UNITS(8) |
| 66 | 24F TV HOURS UNITS(1) |
| 67 | 24F TV HOURS UNITS(2) |
| 68 | 24F TV HOURS UNITS(4) |
| 69 | 24F TV HOURS UNITS(8) |
| 70 | VITC SYNC BIT(1) |
| 71 | VITC SYNC BIT(0) |
| 72 | 30F TV HOURS TENS(1) |
| 73 | 30F TV HOURS TENS(2) |
| 74 | BINARY GROUP FLAG 1 |
| 75 | BINARY GROUP FLAG 2 |
| 76 | 24F TV HOURS TENS(1) |
| 77 | 24F TV HOURS TENS(2) |
| 78 | Pull Down Sequence bit 2 → d2 |
| 79 | Pull Down Sequence bit 3 → d3 |
| 80 | VITC SYNC BIT(1) |
| 81 | VITC SYNC BIT(0) |
| 82 | VITC CRCC CODE |

FIG.10

|  | IN | OUT | TYPE OF TAPE |
|---|---|---|---|
| A-1 | 00:02:00:10 | 00:05:12:18 | VIDEOTAPE 9 |
| A-2 | 00:08:30:02 | 00:10:15:06 | VIDEOTAPE 9 |
| A-3 | 00:03:15:10 | 00:07:20:16 | VIDEOTAPE 11 |
| A-4 | .... | .... | VIDEOTAPE 11 |
| A-5 | .... | .... | VIDEOTAPE 9 |

FIG.23

VIDEO SIGNAL PROCESSING DEVICE AND METHOD

TECHNICAL FIELD

The present invention relates to a video signal processing apparatus that can specify original frames with the time code of a video signal, in the case where the frame rate of the video signal has been converted. More particularly, the present invention relates to a video signal processing apparatus designed to insert the original time code added to a source video signal of 24-frame rate, into a video signal of 30-frame rate, which has been converted from the source video signal of 24-frame rate.

The present invention relates to a video data editing apparatus, too. The video data editing apparatus performs off-line edition on video signals of 30-frame rate, each generated from an original source video signal of 24-frame rate, thereby to prepare an edition list of 24-frame rate.

BACKGROUND ART

Hitherto, the television signals used in producing cinemas are video data of 24-frame rate (i.e., 24 frames/sec). A standard television signal, such as an NTSC television signal, is composed of 30-frame rate video data. To broadcast a cinema video program by television, a telecine device is used to convert images recorded on film into video signals. In the telecine device, an imaging element captures the images on the film, at the 24-frame rate, generating a 24-frame rate video signal. The 24-frame rate video signal is subjected to 2-3 pull-down process. A 30-frame video signal (an NTSC television signal) is thereby generated. The 2-3 pull-down process is a process of converting two fields to three fields, for every four fields. For example, of the top and bottom fields that constitute a frame, the top field is repeated, thereby converting the two fields to three fields. The field added by performing the 2-3 pull-down process is called "repeated field."

Off-line edition and on-line edition are performed on the 30-frame video signal generated by the 2-3 pull-down process, in order to provide a television program that is to be broadcast. The off-line edition is a process of determining an edition point for the video material of 30-frame rate, by the use of an editing system composed of inexpensive devices, and thereby preparing an edition list called "EDL (Edit Decision List)." The on-line edition is a process of generating a master television program from the edition list prepared by performing the off-line edition and the original video material of 30-frame rate.

The conventional editing system is designed to record, reproduce and transmit video signals of 30-frame rate. This is because the standard television signals, i.e., NTSC television signals, are of 30-frame rate. The VHS-format VTRs or the like, which have been widely used as off-line editing systems, can indeed record, reproduce and transmit the standard NTSC television signals of 30-frame rate, but cannot record, reproduce or transmit television signals of 24-frame rate.

Under these circumstances, it is recently demanded that the original video material be obtained by video cameras at the 24-frame rate, not at the 30-frame rate, thereby to provide original video material of 24-frame rate. This is because, in the digital television broadcasting (DTV broadcasting) recently started in some countries, the video data transmitted to households are encoded in accordance with the MPEG2 standards and distributed in the form of a transport stream. As described in the PCT application (WO 00/13418) filed by the assignee of this application, any 30-frame rate, video program prepared by the 2-3 pull-down process must be converted back to a 24-frame rate program by means of the inverse 2-3 pull-down process, before it is encoded in the MPEG2 format. The 30-frame rate program needs to be so converted, because the MPEG2 data-compressing algorithm utilizes bi-directional, predicting coding, wherein two pictures preceding and following the picture of interest, respectively, are used, in order to increase the data-compression rate. If a video signal, which contains a redundant field, e.g., a repeated field, will represent an image of extremely low poor quality if it is encoded without being modified.

Movie video programs and television programs are now converted, in increasing numbers, to data streams compressed by MPEG2 coding technique. The data streams thus generated are recorded on recording media such as DVD discs. More and more DVD discs, each with a video program recorded on it, are now sold.

In favor of DTV technique and DVD technique, it is increasingly demanded that video cameras take pictures at 24-frame rate, thereby to generate 24-frame rate, original video materials.

However, the off-line editing system composed of an inexpensive apparatus, such as the home-use VHS VTR, can record, reproduce and transmit only video signals of 30-frame rate. To accomplish an off-line editing process, 24-frame rate, video programs must be subjected to the 2-3 pull-down process, thereby to generate 30-frame rate, video programs.

If original source video data of 24-frame rate is converted to video data of 30-frame rate by the 2-3 pull-down process, however, the 24-frame rate time codes that correspond to the original source video data cannot be transmitted, though the 30-frame rate time codes that correspond to 30-frame rate video data can be transmitted. This is because only time codes of the video data to be transmitted are defined in the SMPTE-12M standards of transmitting time codes. According to the SMPTE-12M standards, the only timing codes of 30-frame rate can be superposed on carrier waves during the blanking period of, for example, a 30-frame rate video signal. During the blanking period of a 24-frame rate video signal, only time codes of 24-frame rate can be superposed on carrier waves.

In other words, 30-frame rate time code cannot be identified with the corresponding 24-frame rate time codes during the off-line editing process. It is therefore impossible to identify the frames of 30-frame rate video data with the corresponding 24-frame rate video data. Consequently, frames, each containing a repeated field, remain in the master video program. If this occurs, particularly if repeated fields remain in the master video program, the repeated fields will be removed when the MPEG2 coding is carried out. This may results in the problem that the video signals will have but insufficient fields.

Another problem arises. An edition list of 30-frame rate, if any prepared, cannot be used as an edition list in editing any original source video program of 24-frame rate.

DISCLOSURE OF THE INVENTION

The present invention has been made in consideration of the foregoing. An object of the invention is to provide a video signal processing apparatus that can specify original frames, in the case where the frame rate of video signals has been converted. Another object of the invention is to provide a video signal processing apparatus that inserts or transfers the original time code added to a source video signal of 24-frame rate, into or to a video signal of 30-frame rate, which has been converted from the source video signal of 24-frame rate. Still another object of the invention is to provide a video data editing apparatus that performs off-line edition on video signals of 30-frame rate, each generated from an original source video signal of 24-frame rate, thereby to prepare an edition list of 24-frame rate.

To achieve the objects specified above, a video signal processing apparatus according to the invention comprises: signal-generating means for converting a frame rate of a first video signal, thereby generating a second video signal; and data-inserting means for inserting a time code of the first video signal into the second video signal.

The first video signal is, for example, a 24-frame rate video signal. The second video signal is, for example, a 30-frame rate video signal. The time code of the first video signal is data representing the hour, minute, second and frame, all relating to the each field of the first video signal.

In the present invention, the time code of the first video signal is inserted in the second video signal. More precisely, the time code is inserted in the user area or the like of the VITC data of the second video signal.

Hence, the time code of the first video signal can be determined from the VITC data of the second video signal.

A video signal processing apparatus according to this invention comprises: signal-generating means for converting a frame rate of a first video signal, thereby generating a second video signal; and data-inserting means for inserting a sequence number into the second video signal. The sequence number indicates the order in which fields exist in the second video signal.

In the present invention, the sequence number indicating the order in which fields exist in the second video signal is inserted into the second video signal in order to convert the frame rate of the first video signal, thereby to generate the second video signal. The sequence number is inserted in, for example, the user area of the VITC data of the second video signal.

A video signal processing apparatus according to the invention comprises: data-extracting means for extracting a sequence number from a first video signal containing the sequence number that indicates the order in which fields exist in the first video signal; and data-generating means for processing the fields of the first video signal in accordance with the sequence number extracted by the data-extracting means, thereby generating a second video signal.

The present invention relates to a so-called inverse pull-down converter, too. The converter can extract a sequence number from a video signal, process the fields of the video signal in accordance with the sequence number, thereby to perform the inverse pull-down process at high speed.

This invention provides a video data processing apparatus designed to perform signal processing on source video data. The video data processing apparatus comprises: means for converting 24-frame rate source video data to 30-frame rate video data by means of 2-3 pull-down process; and means for describing a 30-frame rate time code corresponding to the 30-frame rate video data, as VITC data about the 30-frame rate video data, and describing a 24-frame rate time code corresponding to the 24-frame rate video data, in an user bit area.

In this invention, 24-frame rate source video data is converted to 30-frame rate video data by means of 2-3 pull-down process, a 30-frame rate time code corresponding to the 30-frame rate video data is described as VITC data about the 30-frame rate video data, and a 24-frame rate time code corresponding to the 24-frame rate source video data is described in an user bit area.

The present invention provides a video data editing apparatus comprising: means for receiving 30-frame rate video data generated by performing 2-3 pull-down process on 24-frame rate source video data; data-extracting means for extracting a time code corresponding to the 24-frame rate video data inserted in a user bit area of the VITC data contained in the 30-frame rate video data; and means for generating an edition list of 24-frame rate, for use in editing the 24-frame rate source video data in accordance with the 24-frame rate time code.

The present invention relates to off-line edition. In the invention, 30-frame rate video data generated by performing 2-3 pull-down process on 24-frame rate source video data is received. A time code corresponding to the 24-frame rate video data is extracted from a user bit area of the VITC data contained in the 30-frame rate video data. An edition list of 24-frame rate is generated. The edition list may be used editing the 24-frame rate source video data in accordance with the 24-frame rate time code.

The invention provides a video data editing apparatus. The video data editing apparatus comprises an on-line editing device for processing 24-frame rate video data, and an off-line editing device for processing 30-frame rate data. The off-line editing device comprises: means for receiving 30-frame rate video data generated by performing 2-3 pull-down process on 24-frame rate source video data; and means for generating an edition list of 24-frame rate, for use in editing the 24-frame rate source video data in accordance with the 24-frame rate time code which corresponds to the 24-frame rate source video data inserted in the user bit area of the VITC data contained in the 30-frame rate video data. The on-line editing device comprises means for editing the 24-frame rate source video data in accordance with the edition list of 24-frame rate.

The invention provides an editing apparatus that performs both an on-line process and an off-line process.

This apparatus comprises an on-line editing device for processing 24-frame rate video data, and an off-line editing device for processing 30-frame rate video data. The off-line editing device receives 30-frame rate video data generated by performing 2-3 pull-down process on 24-frame rate source video data, and generates an edition list of 24-frame rate, for use in editing the 24-frame rate source video data in accordance with the 24-frame rate time code which corresponds to the 24-frame rate source video data inserted in the user bit area of the VITC data contained in the 30-frame rate video data. The on-line editing device edits the 24-frame rate source video data in accordance with the edition list of 24-frame rate.

The present invention provides a video data editing apparatus. This apparatus comprises means for receiving 30-frame rate video data generated by performing 2-3 pull-down process on 24-frame rate source video data. The 30-frame rate video data contains a 30-frame rate time code described, as VITC data about the 30-frame rate video data, in a bit area that accords with SMPTE-12M standards. The video data also contains a 24-frame rate time code corresponding to the 24-frame rate source video data and a sequence number indicating the order of fields in one sequence of the 2-3 pull-down process, both described in an user bit area of the VITC data of the 30-frame rate video data. The apparatus further comprises: means for generating 24-frame rate video data, by performing inverse 2-3 pull-down process on the 30-frame rate video data in accordance with the sequence number; means for generating an edition list of 24-frame rate, by performing an of-line edition process using the 24-frame rate video data generated by means of the inverse 2-3 pull-down process and the 24-frame rate time code; and means for producing a master video program by performing on-line edition on the 24-frame rate source video data in accordance with the 24-frame rate edition list.

BRIEF DESCRIPTION OF THE DRAWINGS

FIG. 5 is a diagram representing VITC data 101;

FIG. 6 is another diagram depicting VITC data 101;

FIG. 7 is a diagram illustrating VITC data 151;

FIG. 8 is another diagram depicting VITC data 151;

FIG. 9 is a diagram illustrating VITC data 201;

FIG. 10 is another diagram depicting VITC data 201;

FIG. 23 is a diagram showing an edition list; and

BEST MODE FOR CARRYING OUT THE INVENTION

Figure 1:
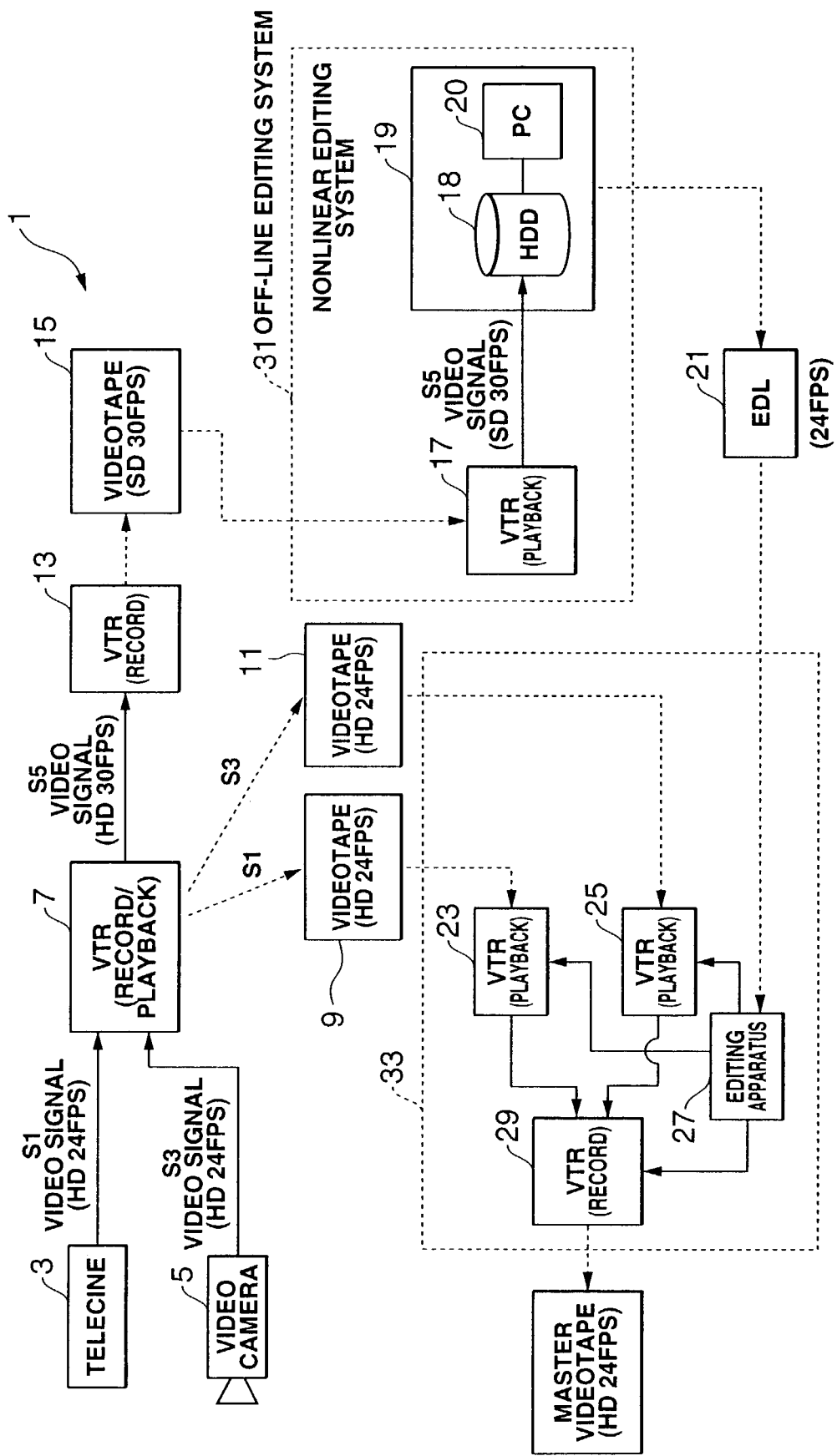
FIG. 1 is a schematic representation of a video signal processing system 1 according to an embodiment of the present invention.

Embodiments of the present invention will be described in detail, with reference to the accompanying drawings. FIG. 1 is a schematic view of a video signal processing system 1, which is one embodiment of the invention.

The video signal processing system 1 comprises a telecine 3, a video camera 5, a videotape recorders (VTRs) 7, 13, 17, 23, 25 and 29, a nonlinear editing device 19, and an editing apparatus 27.

The videotape recorder 17 and the nonlinear editing device 19 constitute an off-line editing system 31. The videotape recorders 23, 25 and 29, the nonlinear editing device 19 and the apparatus 27 constitute an on-line editing system 33.

The telecine 3 is a device that converts images optically recorded on film at 24-frame rate, to electric signals. More precisely, the images recorded on the film are sequentially projected on a CCD at the 24-frame rate, thus accumulating charges in the CCD. The charges are then read from the CCD in the form of electric signals. The electric signals are processed into a digital video signal S1 of 24-frame rate (24 FPS) and high-definition (HD). In the present specification, the term "video signal" shall mean video data. The term "24-frame rate" means the rate of 24 frames per second. Similarly, the term "30-frame rate" means the rate of 30 frames per second.

The video camera 5 has a high-definition (HD) CCD that electrically accumulates images. The CCD accumulates electric charges. The electric charges are read from the CCD at the 24-frame rate. An HD digital video signal S3 is thereby generated.

The videotape recorder 7 receives a 24-frame rate, HD digital video signal from the telecine 3 or the video camera 5 and records the HD digital video signal on magnetic tape. The magnetic tape in a magnetic tape cassette 9 and the magnetic tape in a magnetic tape cassette 11 are recording media for recording source digital video data that is original source video material. The magnetic tape is sent to an on-line editing apparatus, which edits the original material recorded on the magnetic tape. In this embodiment, two magnetic tape cassettes 9 and 11 are used as media that record and transfer the original source video data. Instead, one tape cassette may be used to record the original source video data. Alternatively, three or four tape cassettes may be used. The recording media are not limited to magnetic tape cassettes. Rather, any other recording media can be used, provided they are removable.

The videotape recorder 7 can reproduce the 24-frame rate, HD digital video signal recorded on the magnetic tape. It can output the 24-frame rate, HD digital video signal to any other apparatuses. Not only can the videotape recorder 7 output a 24-frame rate, HD digital video signal. But also can it generate a 30-frame rate HD digital video signal from the 24-frame rate HD digital video signal reproduced, and a 30-frame rate, SD (Standard Definition) video signal S5 by performing down-conversion on the 24-frame rate HD digital video signal reproduced. Note that SD video signals are low-resolution video signals. Of the signals output from the videotape recorder 7, the 30-frame rate, SD digital video signal S5 generated by down-conversion in the later process stage is used in the embodiment of the present invention.

The videotape recorder 13 is a device that receives the 30-frame rate, SD digital videos signal from the videotape recorder 7 and records the signal in an SD videotape cassette 15. The videotape recorder 7 described above is an expensive, high-end device for use in broadcasting stations and is designed to process HD video signals, i.e., high-definition videos signals. By contrast, the videotape recorder 13 is an inexpensive, home-use device, such as a VHS-format VTR, which can record and reproduce standard television signals.

Like the videotape recorder 13, the videotape recorder 17 is an inexpensive, home-use device, such as a VHS-format VTR. It reproduces 30-frame rate, SD digital video signals from the videotape cassette 15 in which the 30-frame rate, SD digital video signals are recorded. The 30-frame rate, SD digital video signals, thus reproduced, are output from the videotape recorder 17.

The nonlinear editing device 19 comprises a hard disc drive 18 and a personal computer 20. The hard disc drive 18 has a random-accessible recording medium. The personal computer 20 can achieve desktop edition. The nonlinear editing device 19 receives a 30-frame rate, SD digital video signal from the videotape recorder 17 and performs a digitizing process on the signal, so that the 30-frame rate, SD digital video signal may be recorded on the hard disc provided in the drive 18. In the digitizing process, the video material recorded on the tape is recorded on a random-accessible recording medium such as a hard disc, in order to accomplish nonlinear edition of data.

In the nonlinear editing device 19, all fields of a 30-frame rate video signal are not recorded on the hard disc 18 by using sequence data 301, which will be described later. Rather, only the 24 frames of the original video material are recorded on the hard disc 18. In other words, the hard disc drive 18 records data, without recording, on the hard disc, the repeated fields that have been added during the conversion of the 24-frame rate signal to the 30-frame rate signal. This data recording on the hard disc will be later described in detail.

The nonlinear editing device 19 is used to perform an off-line editing process. The editor-operator operates the GUI (Graphical User Interface) displayed on the display of the personal computer 20. When the editor-operator operates the GUI, the 24-frame rate digital video signal recorded on the hard disc is accessed, whereby an edition point is determined and an effect is set. As a result, there can be prepared a 24-frame rate edition list, or EDL (Editing Decision List) 21. As indicated above, the videotape recorder 17 and the nonlinear editing device 19 constitute the off-line editing system 31. The off-line editing system 31 is not an apparatus configured to produce video programs through the edition the editor-operator has accomplished. Rather, it is an apparatus designed to prepare an edition list L21 that will be used in the on-line process at a later stage.

Like the videotape recorder 7, the videotape recorders 23, 25 and 29 are expensive, high-end VTRs for use in broadcasting stations. They are designed to process HD digital video signals. The videotape recorder 23 receives a 24-frame rate, original HD video signal S1 recorded on videotape 9. The recorder 23 then reproduces a source video signal recorded on the magnetic tape in accordance with a control signal supplied from the editing apparatus 27. The videotape recorder 23 receives a 24-frame rate, original HD video signal S3 recorded on videotape 11. It then reproduces a source video signal recorded on the magnetic tape in accordance with a control signal supplied from the editing apparatus 27. The videotape recorder 29 receives a 24-frmae rate, HD video signal reproduced by the videotape recorder 23 or the videotape recorder 25. It then records a 24-frame rate, edited HD video signal on master videotape 30, as a master video program. The editing apparatus 27 receives the edition list 21 that the off-line editing system has generated. The apparatus 27 controls the data-reproducing processes in the videotape recorders 23 and 25 and the data-recording process in the videotape recorder 29.

In the present embodiment, the on-line editing system 33 does not generates edition lists and uses the edition list that the off-line editing system 31 has produced, for the following reason. In the ordinary editing process, the editor-operator spends more time in determining an edition point and setting effects to prepare an edition list, than in doing any other work. It takes him or her several hours to tens of hours to determine the edition point and set the effects. Including videotape recorders for use in broadcasting stations, the on-line editing system is very expensive. Even large broadcasting stations have only a few on-line editing systems. It is waste of money, if such an expensive system is occupied for several hours or tens of hours to prepare nothing more than edition lists. Therefore, an inexpensive the off-line editing system, which comprises an inexpensive, home-use VTR and a general-purpose computer, should better be used to prepare edition lists. Then, the on-line editing process is performed on the basis of the edition lists thus prepared. The time the on-line editing system is occupied is thereby shortened. This is why the edition lists prepared by using the off-line system 31 are used in the on-line editing system 33.

Figure 2:
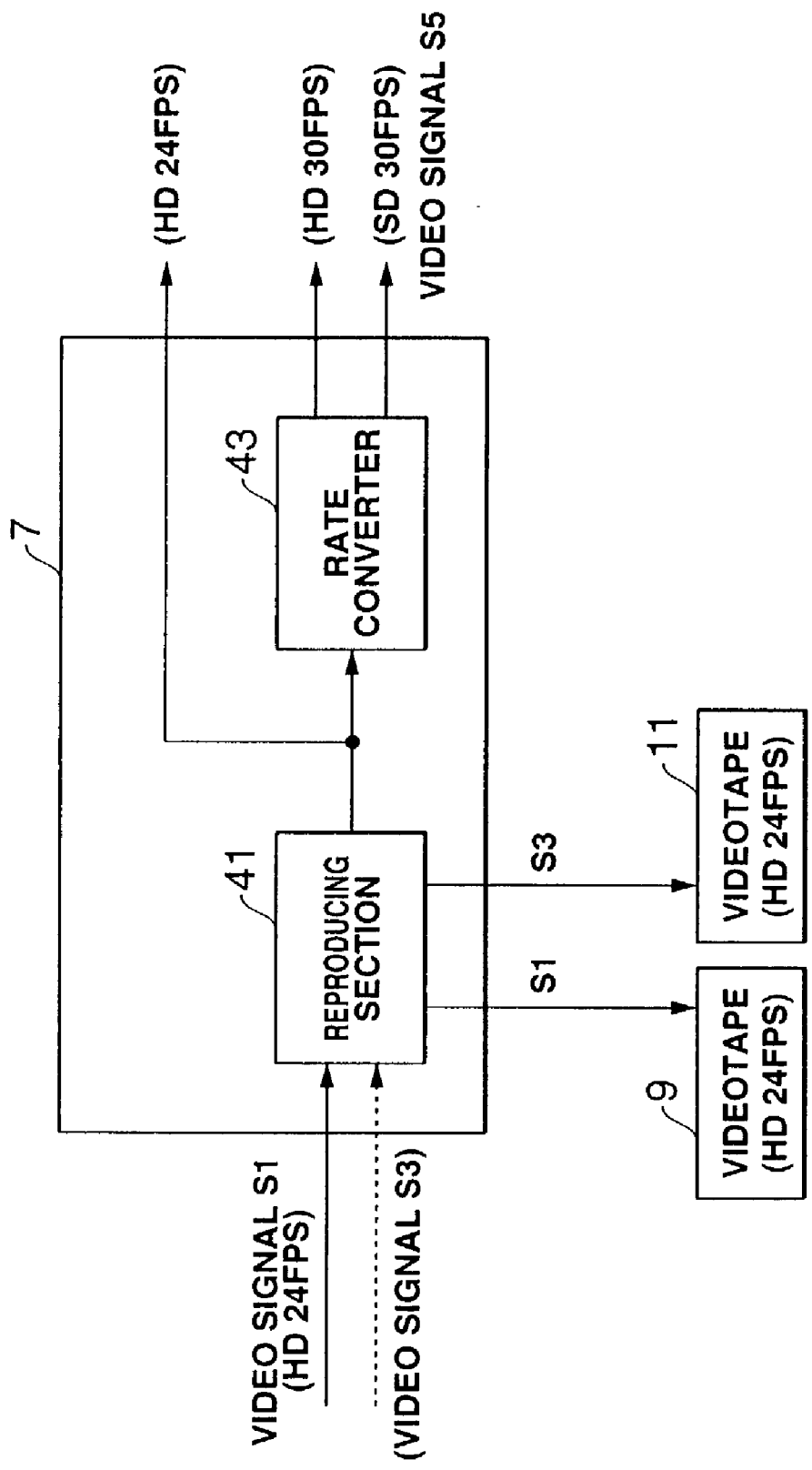
FIG. 2 is a schematic view of a videotape recorder 7.

FIG. 2 is a schematic view of the videotape recorder 7. The videotape recorder 7 has a reproducing section 41, a rate converter 43 and the like. The reproducing section 41 is a block that performs a recording process and a reproducing process. In the recording process, it records a 24-frame rate, source HD video signal it has received, on magnetic tape. In the reproducing process, it reproduces the 24-frame rate, HD video data recorded on the magnetic tape. The 24-frame rate, HD video signal reproduced is supplied to an external apparatus such as a video switch or a video server, and also to the rate converter 43.

The rate converter 43 receives the 24-frame rate, HD video signal. The rate converter 43 performs two functions. First, it generates a 30-frame rate, HD video signal from the 24-frame rate, HD video signal. Second, it generates a 24-frame rate, SD video signal from the 24-frame rate, HD video signal.

Figure 3:
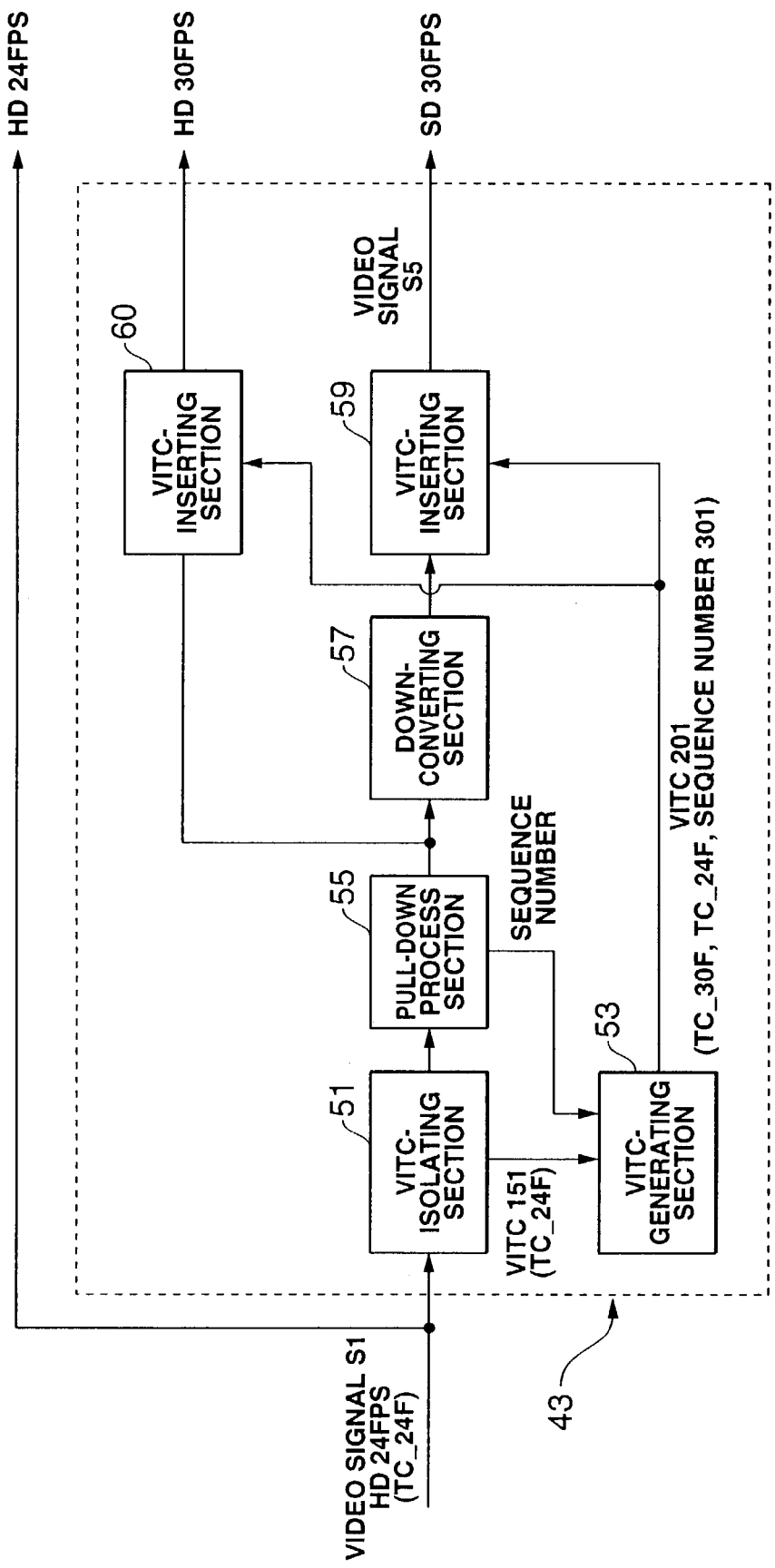
FIG. 3 is a schematic view of a rate converter 43.

FIG. 3 is a schematic view of the rate converter 43, too. As FIG. 3 shows, the rate converter 43 comprises a VITC-isolating section 51, a VITC-generating section 53, a pull-down process section 55, a down-converting section 57, and VITC-inserting sections 59 and 60.

The VITC-isolating section 51 receives a 24-frame rate, HD video signal from the reproducing section 41. It then isolates a VITC (Vertical Internal Time Code) data 151 from the 24-frame rate, HD video signal. Note that the VITC data 151 has been inserted into the video signal into the blanking part thereof. Data about a time code TC 24F of 24-frame rate is superposed in the VITC data 151.

The pull-down process section 55 receives the 24-frame rate, HD video signal from the VITC-isolating section 51. It performs 2-3 pull-down process on the 24-frame rate, HD video signal, thus generating a 30-frame rate, HD video signal. Every time the pull-down process section 55 performs the pull-down process on one field, it supplies sequence data to the VITC-generating section 53. The sequence data shows the ordinal number assigned to the field, indicating the position the field takes in one sequence of the 2-3 pull-down process.

The down-converting section 57 is a block that receives the 30-frame rate, HD video signal from the pull-down process section 55. This block performs down-conversion on the HD video signal of high resolution, converting the same to an SD video signal of low-resolution. In this embodiment, the down-converting section 57 converts the HD video signal to a 30-frame rate, SD video signal of low-resolution and outputs the 30-frame rate, SD video signal.

The VITC-generating section 53 extracts a 24-frame rate time code TC 24F from the VITC data 151 isolated by the VITC-isolating section 51. The 24-frame rate time code TC 24F is described in the VITC data in accordance with the SMPTE (Society of Motion Picture and Television Engineers) standards. The VITC-generating section 53 generates a 30-frame rate time code TC 30F from a 24-frame rate time code TC 24F. The VITC-generating section 53 receives a sequence number from the pull-down process section 55. From the sequence number, which indicates the sequence of the pull-down process, the section 53 generates 201 that contains a 30-frame rate time code TC 30F, a 24-frame rate time code TC 24F and a sequence number 301. The VITC data 201 is supplied from the section 53 to the VITC-inserting sections 59.

The VITC-inserting section 59 receives the 30-frame rate, SD video signal from the down-converting section 57. It receives the VITC data 201, too, from the VITC-generating section 53. As mentioned above, the VITC data 201 contains the 30-frame rate time code TC 30F, 24-frame rate time code TC 24F and sequence number 301. The VITC-inserting sections 59 inserts the VITC data 210 into the blanking part of the 30-frame rate, SD video signal.

Figure 4:
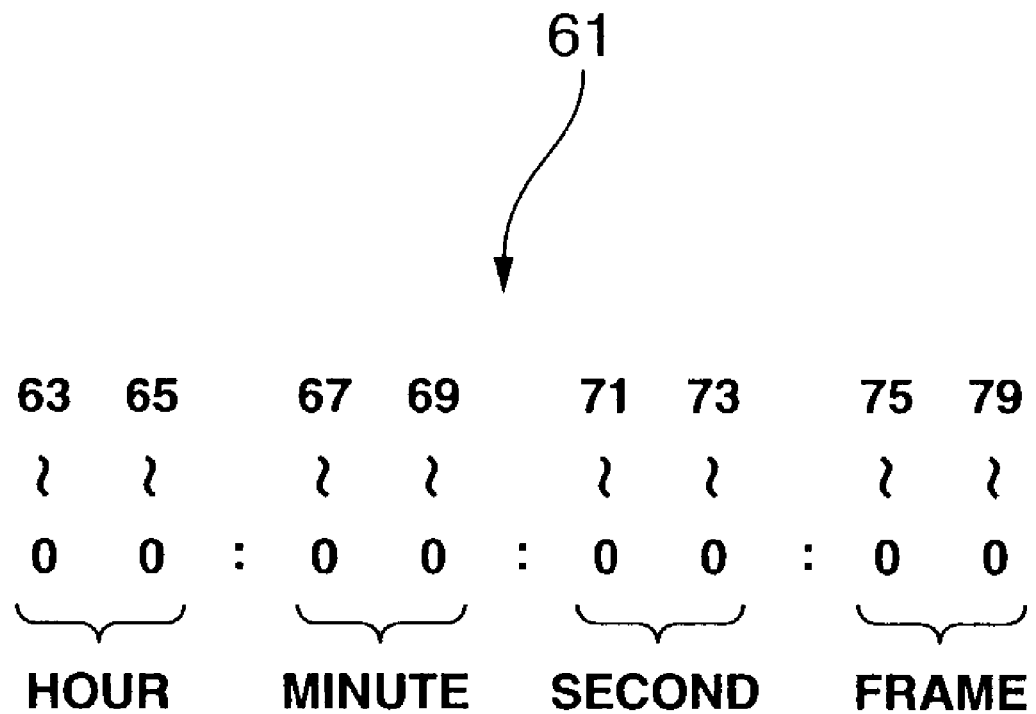
FIG. 4 is a diagram showing a time code 61.
Figure 11:
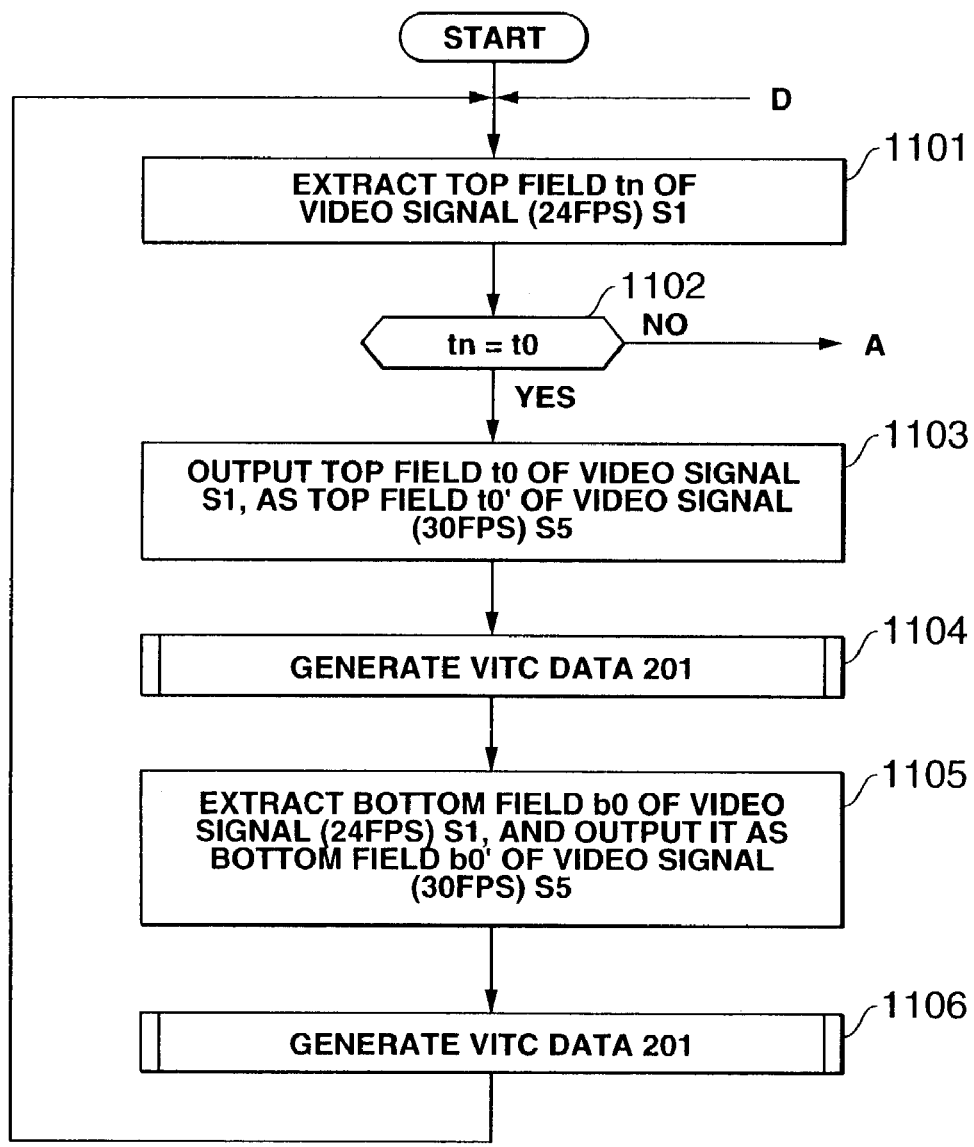
FIG. 11 is a flowchart explaining the process that the rate converter 43 performs.
Figure 12:
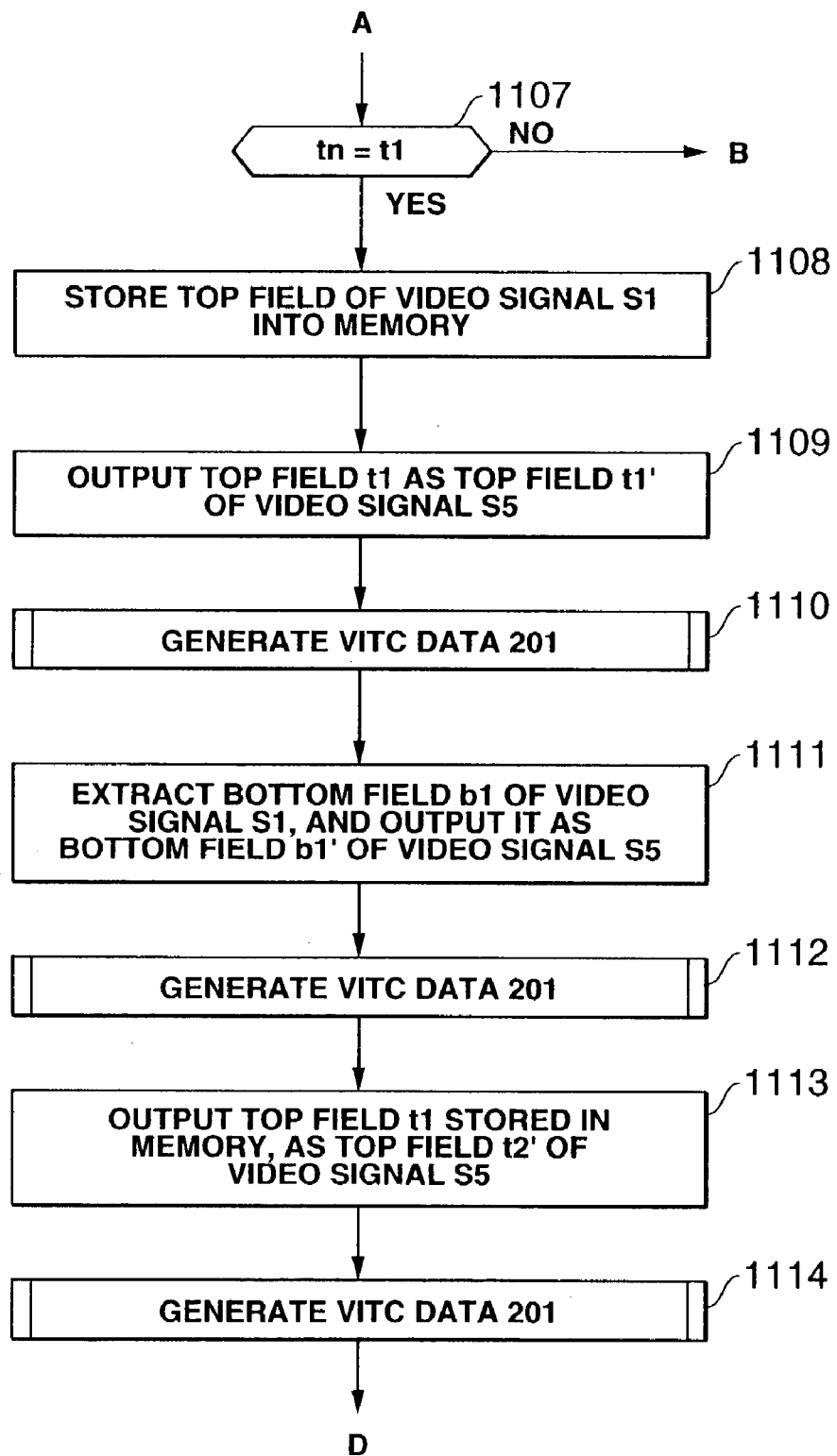
FIG. 12 is another flowchart explaining the process that the rate converter 43 effects.
Figure 13:
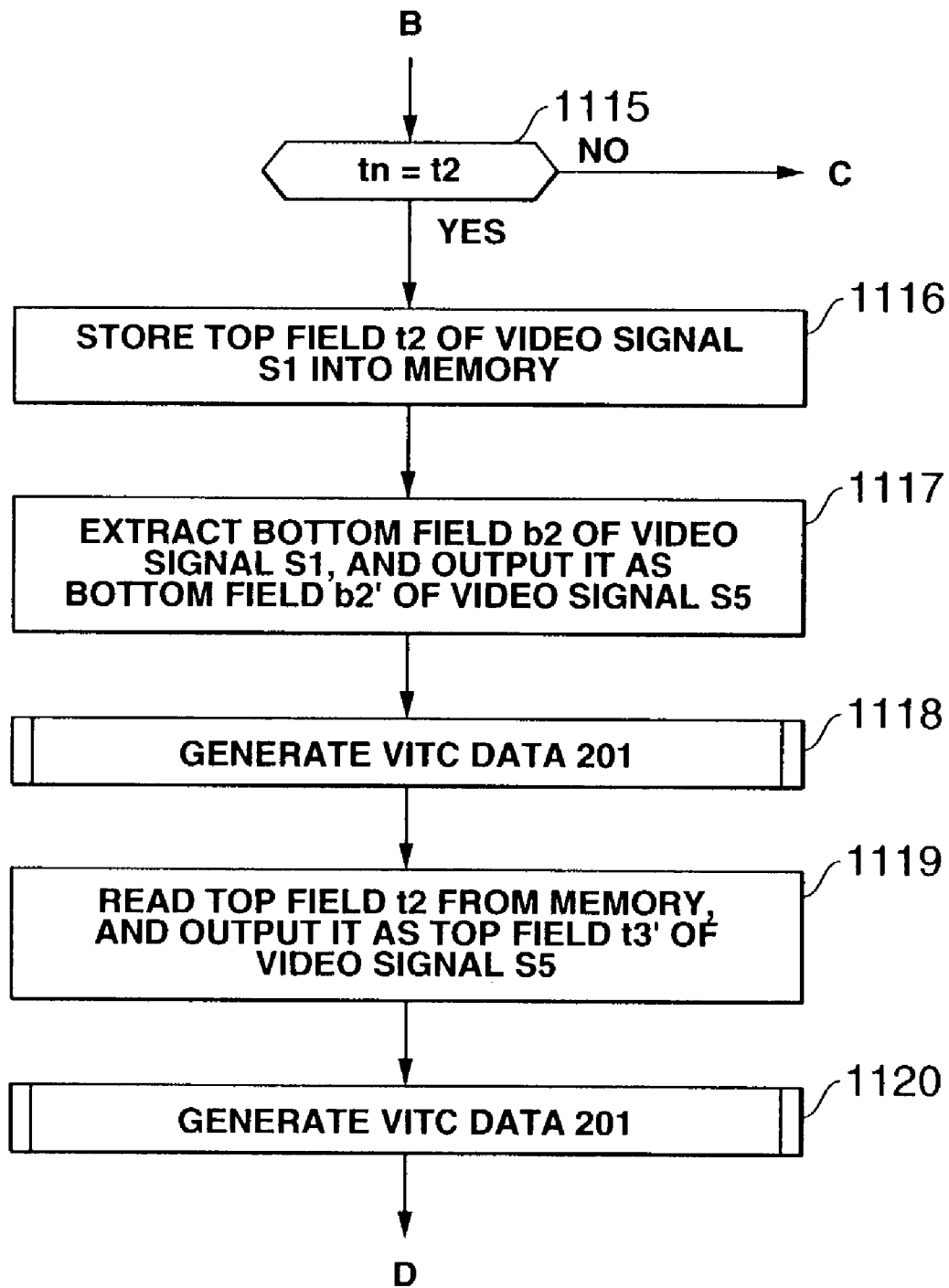
FIG. 13 is still another flowchart explaining the process that the rate converter 43 carries out.
Figure 14:
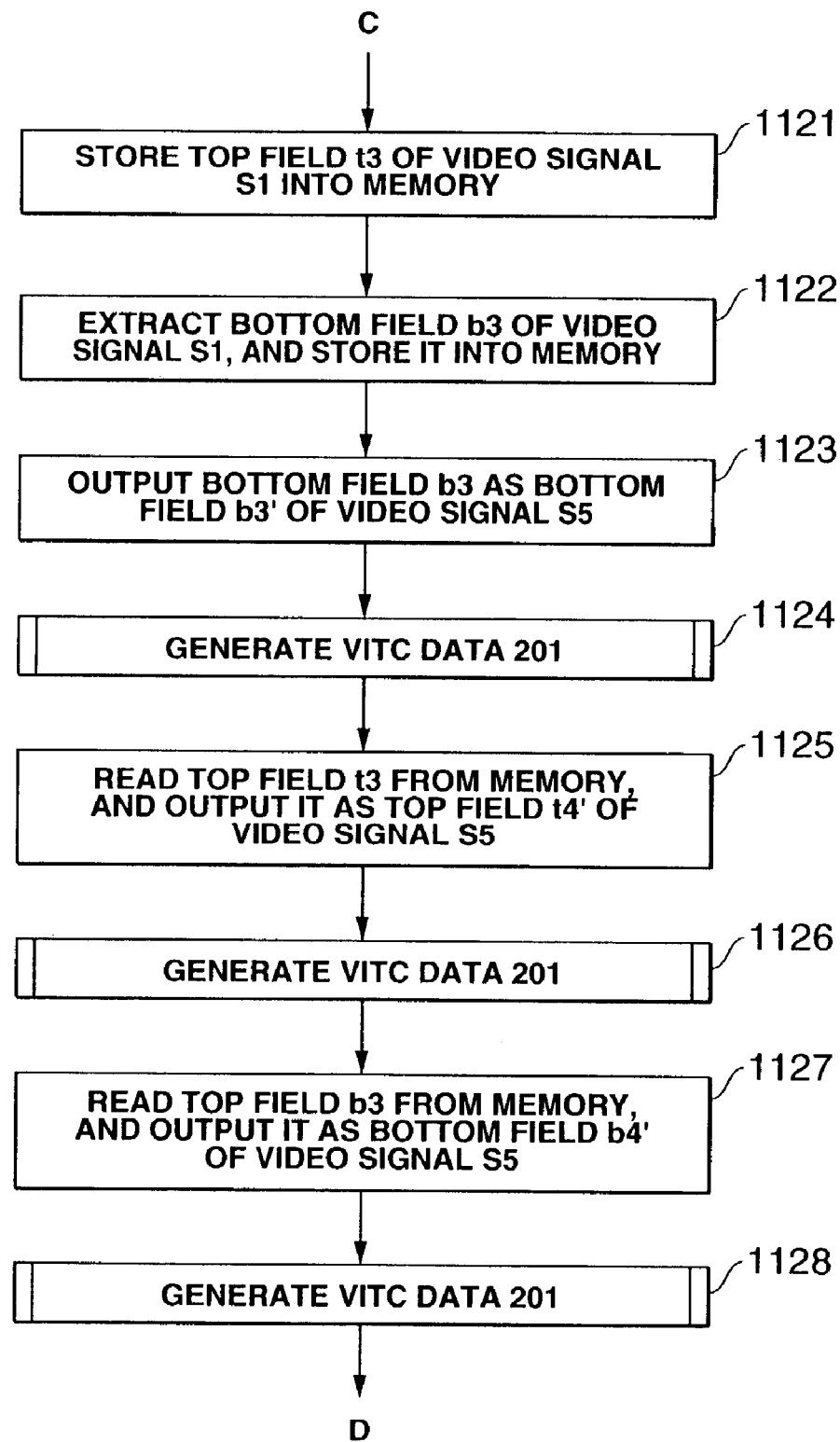
FIG. 14 is a further flowchart explaining the process that the rate converter 43 performs.

FIG. 4 is a diagram showing a time code 61. The main part 61 of the time come is, for example, "00:00:00:00." The first two digits represent the hour, the second two digits the minute, the third two digits the second, and the last two digits the frame.

As FIG. 4 shows, the hour is indicated by digit 63, or the tens place, and digit 65, or the units place. The minute is indicated by digit 67, or the tens place, and digit 69, or the units place. The second is indicated by digit 71, or the tens place, and digit 73, or the units place. The frame is identified by digit 75, or the tens place, and digit 79, or the units place.

FIGS. 5 and 6 are diagrams representing VITC data 101 that conforms to SMPTE-12M standards. They show the standard of VITC data. Although the SMPTE-12M standards are well known, they will be explained to facilitate the understanding that the present invention differs from the SMPTE-12M standards, though it conforms to the SMPTE-12M standards.

The VITC data 101 defined by the SMPTE-12M standards is 83-bit data. The 0th bit, 1st bit, 10th bit, 11th bit, 20th bit, 21st bit, 30th bit, 31st bit, 40th bit, 41st bit, 50th bit, 51st bit, 60th bit, 61st bit, 70th bit, 71st bit, 80th bit, and 81st bit are synchronization bits 103-1, 103-2, 103-3, 103-4, 103-5, 103-6, 103-7, 103-8 and 103-9.

The second to fifth bits represent a frame data area 105-1. The frame data area 105-1 indicates the units place, 79, which is shown in FIG. 4. The place 79 may be assumed by one of the numerals "1" to "9." The second to fifth bits represent the units place, 79.

The 12th bit and the 13th bit represent a frame data area 105-2. This frame data area 105-2 indicates the tens place, 75, which is shown in F 4.

The source HD video signal S1 is a 24-frame rate signal. The tens place, 75, of the frame is therefore either "1" or "2." The 12th bit and the 13th bit represent the tens place, 75, of the frame.

The VITC data 101 has user bit areas that the user can use freely. The 6th to 9th bits define the user bit area 113-1. The 16th to 19th bits define the user bit area 113-2. The 26th to 29 the bits define the user bit area 113-3. The 36th to 39th bits define the user bit area 113-4. The 46th to 49th bits define the user bit area 113-5. The 56th to 59th bits define the user bit area 113-6. The 66th to 69th bits define the user bit area 113-7. The 76th to 79th bits define the user bit area 113-8.

The 22nd to 25th bits represent a second data 107-1. The second data area 107-1 indicates the units place, 73, of the second, which is shown in FIG. 4. The 32nd to 34th bits define a second data area 107-2. This second data area 107-2 indicates the tens place, 71, of the second, which is illustrated in FIG. 4.

The 42nd to 45th bits represent a minute data area 109-1. The minute data area 109-1 indicates the units place, 69, of the minute, which is shown in FIG. 4. The 52nd to 54th bits represent a minute data area 109-2. This minute data area 109-2 indicates the tens place, 67, of the minute, which is shown in FIG. 4.

The 62nd to 65th bits represent an hour data area 111-1. The hour data area 111-1 indicates the units place, 65, of the hour, which is shown in FIG. 4. The 72nd bit and the 73rd bit represent an hour data area 111-2. This hour data area 111-2 indicates the tens place, 63, of the hour, which is shown in FIG. 4.

The 35th bit is a field phase flag 108. If the 35th bit is "0," the field into which the VITC data has been inserted is the top field. If the 35th bit is "1," the field into which the VITC data has been inserted is the bottom field.

FIGS. 7 and 8 represent the VITC data 151 that has been inserted into the blanking part of the 24-frame rate, HD video signal S1. The VITC data 151 is data that has been extracted from the source HD video signal by the VITC-isolating section 51.

Four time codes of 24-frame rate, i.e., a hour number, a minute number, a second number and a frame number, are inserted in the hour data areas 111-1 and 111-2, the minute data areas 109-1 and 109-2, the second data areas 107-1 and 107-2, and the frame data areas 105-1 and 105-2, respectively. No data is inserted in the user areas 113-1, 113-2, etc.

FIGS. 9 and 10 represent the VITC data 201 that has been inserted in the blanking part of the 30-frame rate, SD video signal S5 generated by the rate converter 43.

Four time codes TC F30 of 30-frame rate, i.e., a hour number, a minute number, a second number and a frame number, are described in the hour data areas 211-1 and 211-2, the minute data areas 209-1 and 209-2, the second data areas 207-1 and 207-2, and the frame data areas 205-1 and 205-2, respectively. These time codes are described in accordance with the SMPTE-12M standards.

The frame data of the 24-frame rate, the time code TC 24F is described in the user bit areas 213-1 and 213-2 of the VITC data 201. The second data of the 24-frame rate, the time code TC 24F is described in the user bit areas 213-3 and 213-4 of the VITC data 201. The minute data of the 24-frame rate, the time code TC 24F is described in the user bit areas 213-5 and 213-6 of the VITC data 201. The hour data of the 24-frame rate, the time code TC 24F is described in the user bit areas 213-7 and 213-8 of the VITC data 201.

Three 4-bit sequence numbers 301 are written in the user bit area 220-1 for the 39th bit, the user bit area 220-2 for the 59th bit, and the user bit area 220-3 for the 78th and 79th bit, respectively. These sequence numbers 301 represent the ordinary numbers assigned to the fields during the pull-down process. Each sequence number 301 may assume one of the values "0" to "9" and indicates the ordinary number assigned to a field of the 30-frame rate video signal.

Each sequence number 301 is composed of four bits (d3:d2:d1:d0), where d0 is the 39th bit, d1 is the 59th bit, d2 is the 78th bit, and d3 is the 79th bit. The sequence number 301 may be "5," for example. In this case, the sequence number, (d3:d2:d1:d0), is (0:1:0:1).

[Operation of the Embodiment]

How the present embodiment operates will be described below.

The telecine 3 supplies a source HD video signal S1 of 24-frame rate to the videotape recorder 7. Meanwhile, the video camera 3 supplies a source HD video signal S3 of 24-frame rate to the videotape recorder 7.

In the videotape recorder 7, the reproducing section 41 records the source HD video signal S1 on the videotape 9 and the source HD video signal S3 on the videotape 11. The videotape 9 and the videotape 11, thus recorded, are sent to the on-line editing system 33, as original source video materials from which a master video program will be generated.

The reproducing section 41 of the videotape recorder 7 performs the first-stage process for generating a 30-frame rate, SD video signal that will be used in the off-line editing process. More specifically, the section 41 reproduces the source HD video signals from the videotape 9 and the videotape 11 and then outputs a 24-frame rate, HD video signal.

[Process Performed by the Rate Converter 43]

Figure 15:
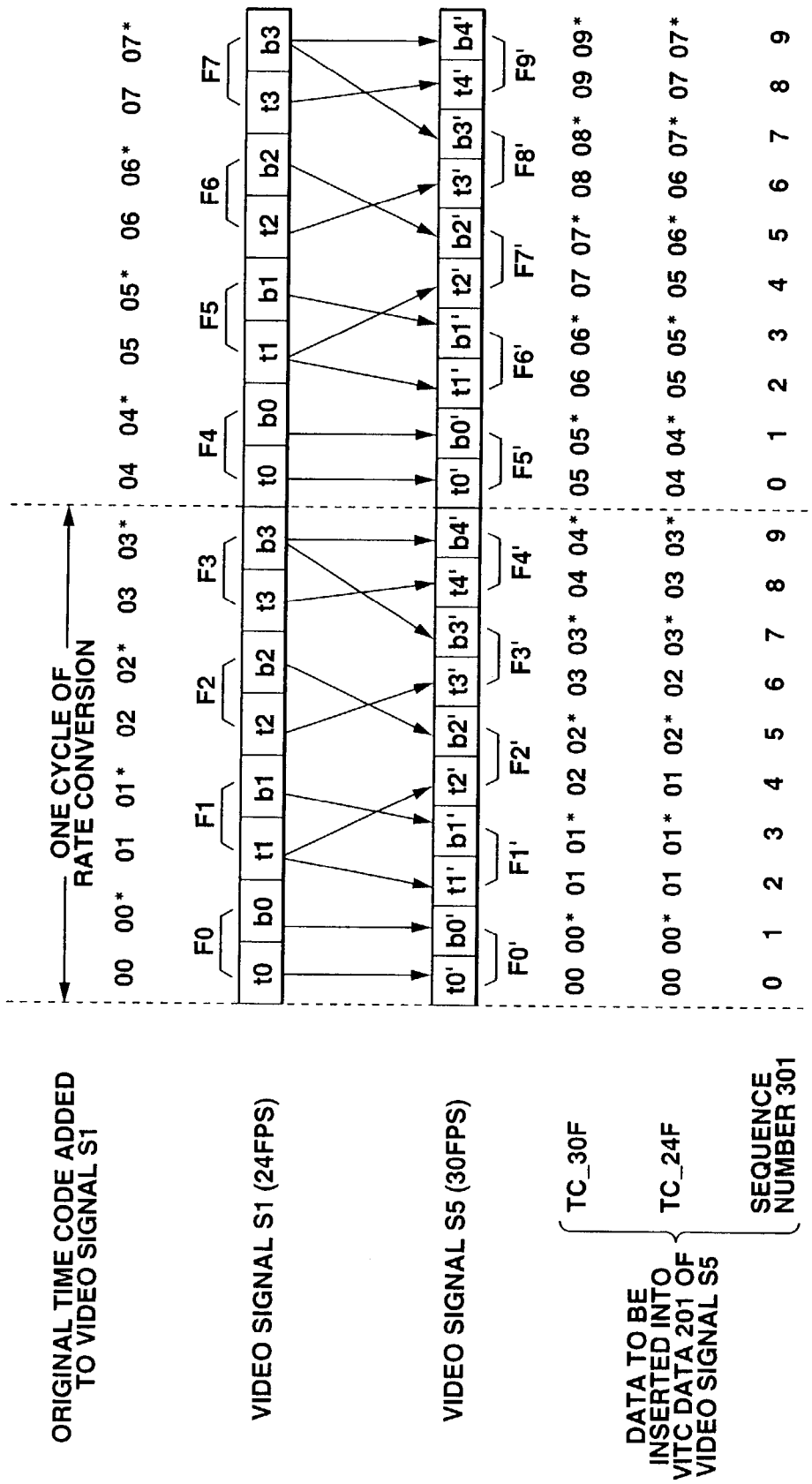
FIG. 15 is a chart explaining a 2-3 pull-down process.
Figure 16:
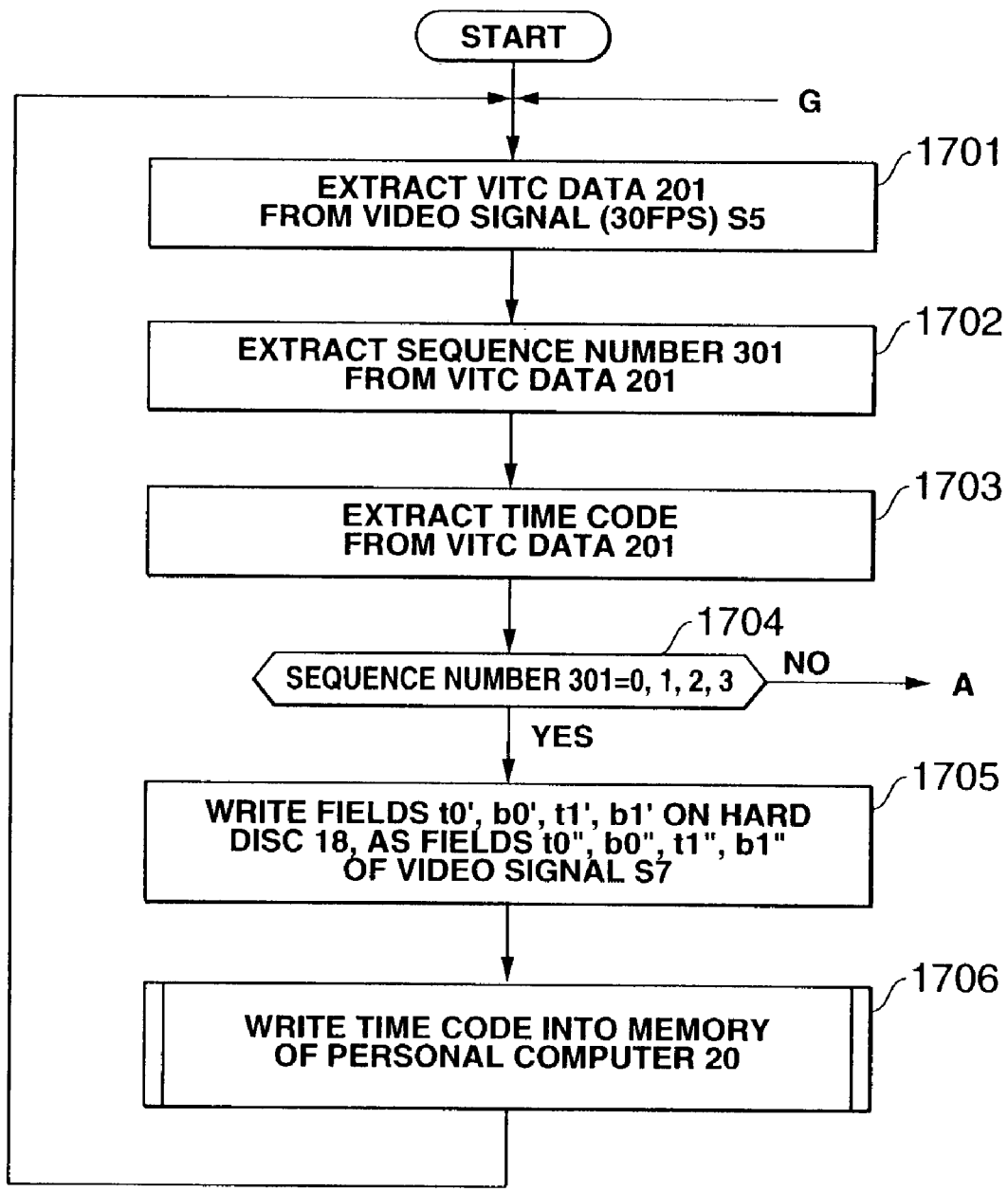
FIG. 16 is a flowchart explaining the digitizing process that a nonlinear editing device 19 carries out.
Figure 17:
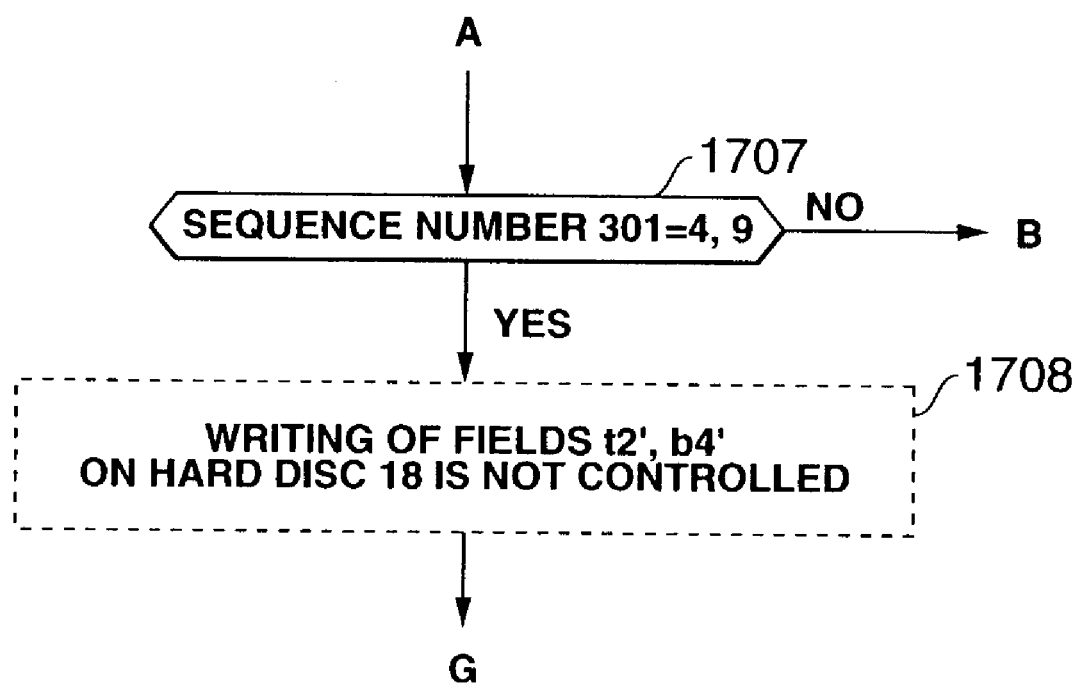
FIG. 17 is another flowchart explaining the digitizing process that the nonlinear editing device 19 performs.
Figure 18:
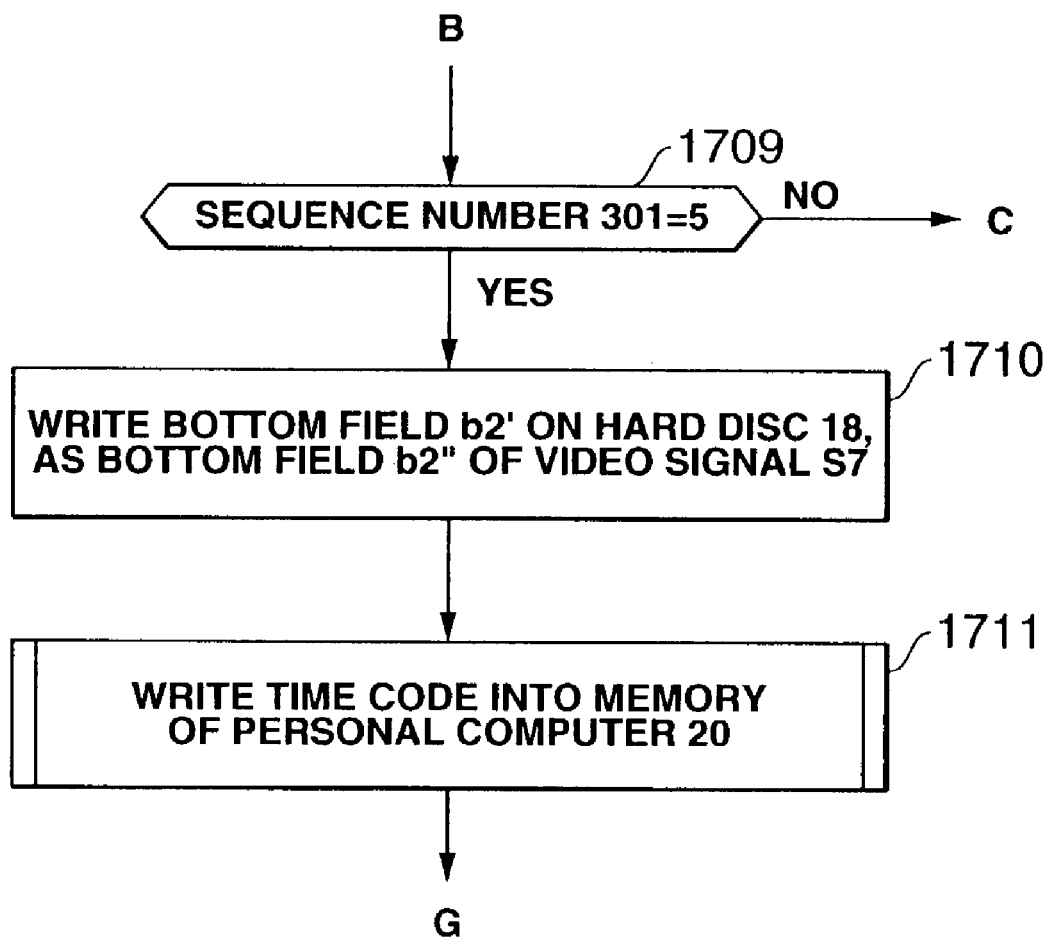
FIG. 18 is a further flowchart explaining the digitizing process that the nonlinear editing device 19 performs.
Figure 19:
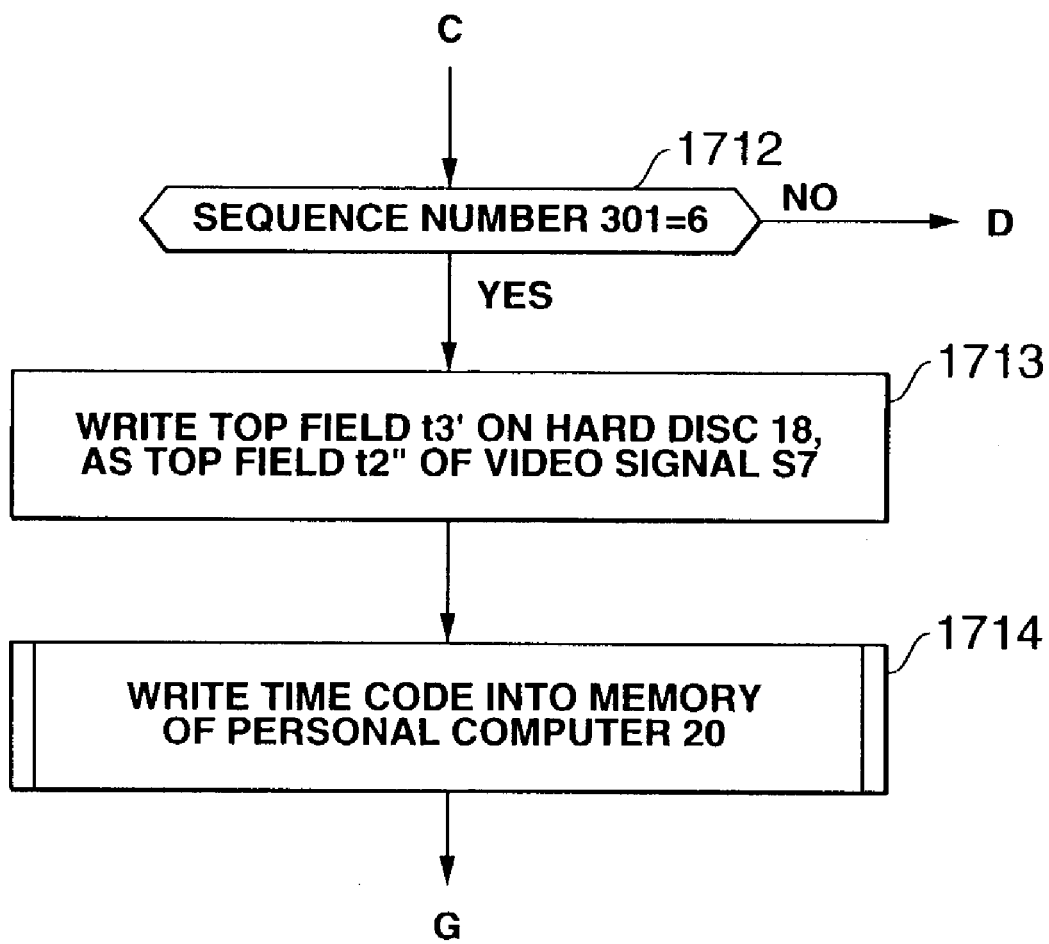
FIG. 19 is still another flowchart explaining the digitizing process that the nonlinear editing device 19 carries out.
Figure 20:
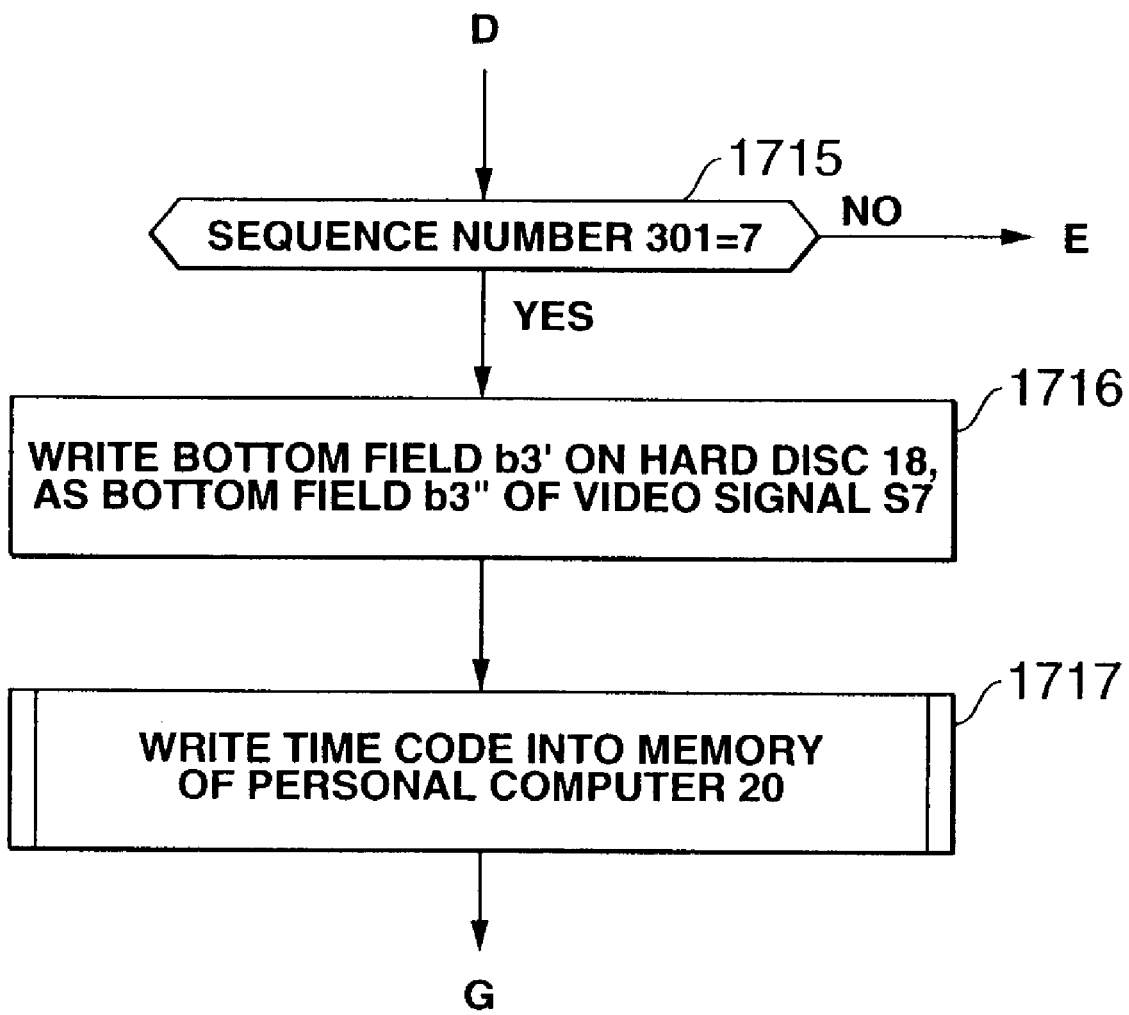
FIG. 20 is a flowchart explaining the digitizing process that the nonlinear editing device 19 effects.
Figure 21:
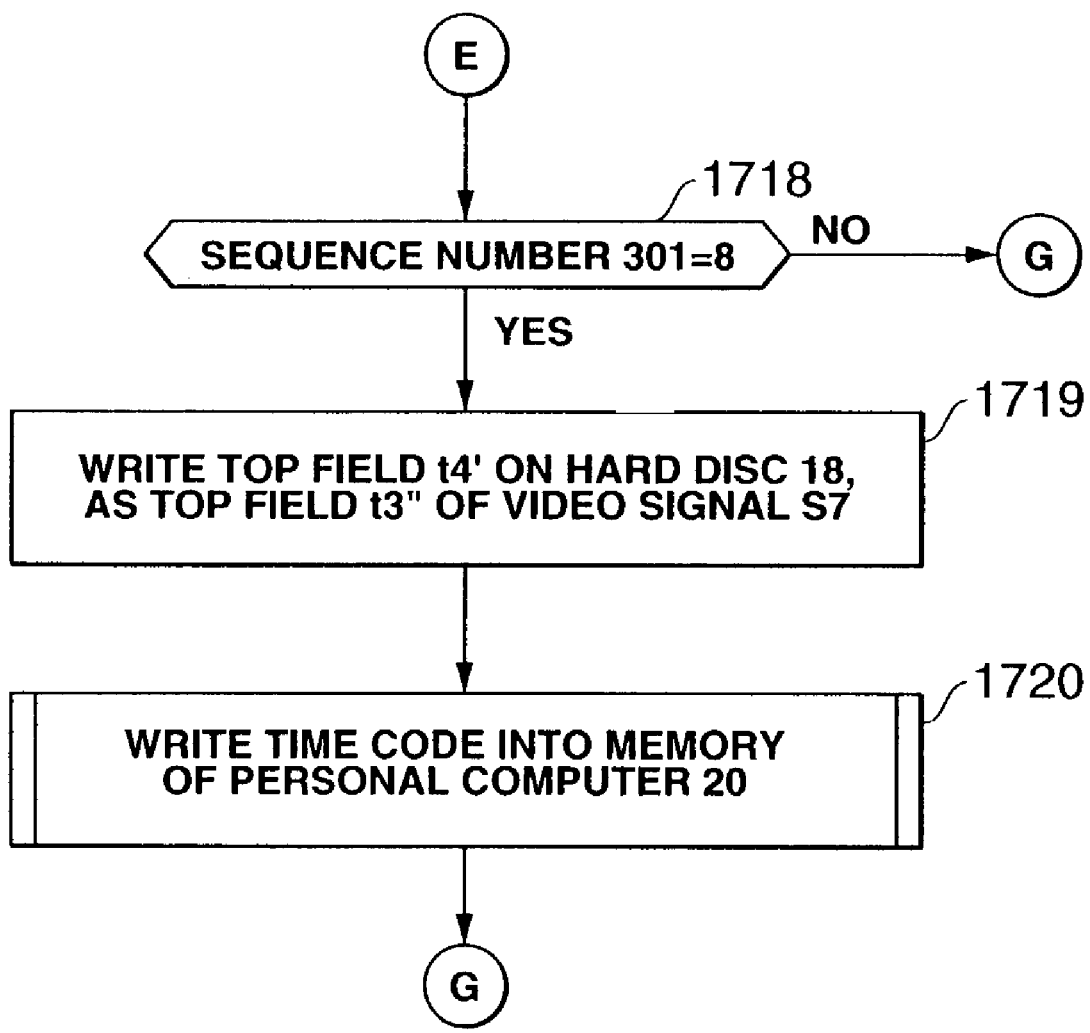
FIG. 21 is another flowchart explaining the digitizing process that the nonlinear editing device 19 performs.

The processes that the pull-down process section 55, VITC-generating section 53 and VITC-inserting sections 59 perform in the rate converter 43 will be explained, with reference to FIGS. 11 to 14 and FIG. 15. FIGS. 11 to 14 are a flowchart explaining the processes that the pull-down process section 55, VITC-generating section 53 and VITC-inserting sections 59 perform. FIG. 15 is a chart representing the relation between the a 24-frame rate, source video signal and a 30-frame rate video signal generated by effecting the 2-3 pull-down process on the source video signal. FIG. 15 shows the relation between the time code data and the sequence data, both inserted in the VITC of the 30-frame rate video signal. In FIG. 15, "t" indicates the top field, "b" the bottom field. Any two-digit number, e.g., "00" shown is the frame-unit part of a time code. The time code of a 24-frame rate video signal or 30-frame rate video signal is actually "00:00:00:00." The mark * is added to some of the time codes. The mark means that the field is a bottom field.

It will be now described how the pull-down process section 55, VITC-generating section 53 and VITC-inserting sections 59 operate in the rate converter 43, for the fields of a 24-frame rate, source HD video signal.

First, how they process the top field of the signal, which constitutes the first frame F0.

In Step 1103, the pull-down process section 55 outputs the top field t0 of the 24-frame rate, video signal S1, as the top field t0' of the 30-frame rate, SD video signal S5, if the field of the 24-frame rate video signal supplied to the VITC-isolating section 51. The top field t0' is the first field of a pull-down process sequence. Hence, the pull-down process section 55 supplies a sequence number "0," which is assigned to the first field, to VITC-generating section 53.

The VITC-generating section 53 generates VITC data 201 that should be inserted into the 30-frame rate, SD video signal (Step 1104). How the section 53 generates the data 201 will be described below in detail.

The VITC-generating section 53 receives from the VITC-isolating section 51 the VICT data 151 superposed on the source HD video signal. From the VITC data 151, the section 53 extracts the 24-frame rate, time code TC 24F described in the SMPTE-12M format. As explained with reference to FIGS. 7 and 8, the VITC data 151 inserted in the 24-frame rate video signal accords with the SMPTE-12M standards. Time codes of 24-frame rate are therefore described in the bit areas 105-1, 105-2, 105-3, 107-01, 107-2, 109-1, 109-2, 111-1 and 111-2. Thus, if the bit data items described in these bit areas are referred to, there can be extracted the data items representing the frame unit, the second, the minute and the hour, which constitute a 24-frame rate time code. The time code of the top field t0, extracted from the VITC data 151, is "00:00:00:00." In order to facilitate the understanding of this invention, the time code of the first frame subjected to the 2-3 pull-down process in this embodiment is, for example, "00:00:00:00."

The VITC-generating section 53 generates a time code TC 30F of 30-frame rate from this time code TC 24F of 24-frame rate. In the present embodiment, the time of 24-frame rate is "00:00:00:00" and is the top field of the first frame of a 30-frame rate video signal. The time code of 30-frame rate is, therefore, "00:00:00:00."

The VITC-generating section 53 receives a sequence number from the pull-down process section 55. The sequence number indicates the position the field subjected to the pull-down process takes in one sequence of the pull-down process. The sequence number is described as a 4-bit data, "d0:d1:d2:d3." In the present embodiment, the top field t0 is the first field subjected to the pull-down process. The sequence number is therefore "1" as is illustrated in FIG. 15. The 4-bit data representing this sequence number, i.e., "d0:d1:d2:d3," is "0:0:0:0."

The VITC-generating section 53 generates new VITC data 201 from the 30-frame rate time code, the 24-frame rate time code and the sequence number. To state more specifically, the SD video signal output from the rate converter 43, which is a 30-frame rate video signal, is described in the bit areas 205-1, 205-2, 205-3, 207-1, 207-2, 209-1, 209-2, 211-1 and 211-2, as has been explained with reference to FIGS. 9 and 10. This is because the SD video signal is a 30-frame rate signal and these bit areas accord with the SMPTE-12M standards. The 24-frame rate time code TC 24F added to the original source HD video signal of 24-frame rate is not described in bit areas that conform to the SMPTE-12M standards. Rather, the time code TC 24F is described in the user bit areas 213-1, 213-2, 213-3, 213-4, 213-5, 213-6, 213-7 and 213-8. The 4-bit data "d0:d1:d2:d3," which represent the sequence number, is inserted into the user bit areas 220-1, 220-2 and 220-3.

The VITC-inserting sections 59 receives the top field t0', i.e., the first field of the 30-frame rate video signal, from the down-converting section 57. It receives the VITC data 201 from the VITC-generating section 53, too. The VITC-inserting sections 59 inserts the VITC data 201 supplied from the VITC-generating section 53, into the blanking part of the top field t0'. As a result, not only a 30-frame rate time code, but also a 24-frame rate time code and a sequence number is superposed on the 30-frame rate vide signal output from the rate converter 43.

How the bottom field b0 that constitutes the fist frame F0 is process will be explained below.

The pull-down process section 55 receives the bottom field b0, i.e., a field of the 24-frame rate, source video signal S1. In Step 1105, the section 55 outputs the bottom field as the bottom field b0' of the 30-frame rate, SD video signal S5. The pull-down process section 55 then supplies the sequence number "1" to the VITC-generating section 53. The sequence number "1" represents that the bottom field b0' is the second field. This is because the bottom field b0' is the second field in the sequence of the pull-down process.

The VITC-generating section 53 generates VITC data 201 (Step 1106). This VITC data 201 is one to be inserted into the 30-frame rate SD video signal. How the section 53 generates the data will be described below.

The VITC-generating section 53 receives the VITC data 151 superposed on the source HD video signal, from the VITC-isolating section 51, in the same way it receives the top field t0. The section 53 extracts, from VITC data 151, the 24-frame rate, time code TC 24F described in the SMPTE-12M format. The 24-frame rate time code is described in the bit areas 105-1, 105-2, 105-3, 107-1, 107-2, 109-1, 109-2, 111-1 and 111-2. The 24-frame rate time code can be extracted by referring to the data described in these bit areas.

In the present embodiment, the time code of the bottom field b0 extracted is "00:00:00:00."

The VITC-generating section 53 generates a 30-frame rate time code TC 30F from the 24-frame rate time code TC 24F. The 30-frame rate time code TC 30F is "00:00:00:00" in this embodiment, because the 24-frame rate time code is "00:00:00:00" in this embodiment and the bottom field of the first frame in the 30-frame rate video signal.

The VITC-generating section 53 receives the sequence number "1" from the pull-down process section 55 and describes this sequence number in four bits. In the present embodiment, the 4-bit data, "d0:d1:d2:d3" representing the sequence number, is "0:0:0:1."

The VITC-generating section 53 generates new VITC data 201 from the 30-frame rate time code, the 24-frame rate time come, and the sequence number. More precisely, the 30-frame rate time code TC 30F is described in the bit areas 205-1, 205-2, 205-3, 207-1, 207-2, 209-1, 209-2, 211-1 and 211-2 that accord with the SMPTE-12M standards as described with reference to FIGS. 9 and 10. This is because the SD video signal output from the rate converter 43 is a 30-frame rate video signal. The 24-frame rate time code TC 24F added to the 24-frame rate, original source HD video signal is described in the user bit areas 213-1, 213-2, 213-3, 213-4, 213-5, 213-6, 213-7 and 213-8. The 4-bit data "d0: d1:d2:d3" representing the sequence number is inserted into the user bit areas 220-1, 220-2 and 220-3.

The VITC-inserting section 59 receives the bottom field b0' of the 30-frame rate video signal from the down-converting section 57. It receives the VITC data 201, too, from the VITC-generating section 53. The VITC-inserting section 59 inserts the VITC data 201 supplied from the VITC-generating section 53 into the blanking part of the bottom field b0'.

It will be described how the top field t1 constituting the second frame F1 is processed.

The top field t1, i.e., a field of the 24-frame rate, source video signal S1, is supplied to the pull-down process section 55 and is then stored temporarily in a memory (Step 1108). The pull-down process section 55 outputs the top field t1 as the top field t1' of the 30-frame rate video signal S5 (Step 1109). The top field t1 is temporarily stored in the memory in order to generate a repeated field by means of the 2-3 pull-down process. The top filed t1' is the third field in the sequence of the pull-down process. Therefore, the pull-down process section 55 supplies a sequence number "2" to the VITC-generating section 53.

The VITC-generating section 53 generates new VITC data 201 to be inserted into the 30-frame rate, SD video signal (Step 1110).

To be more specific, the section 53 receives the VITC data 151 superposed on the source video signal, from the VITC-isolating section 51, in the same way as it receives the above-mentioned top field t0. The section 53 extracts, from VITC data, the 24-frame rate, time code TC 24F. The time code of the top field t1, thus extracted, is "00:00:00:01."

The VITC-generating section 53 generates a 30-frame rate, time code TC 30F from the 24-frame rate, time code TC 24F. The 24-frame rate, time code TC 24F is "00:00:00:01," or the second frame of the 30-frame rate video signal, in the present embodiment. The 30-frame rate time code is therefore "00:00:00:01."

The VITC-generating section 53 generates 4-bit data "0:0:1:0" that represents the sequence number "2" supplied from the pull-down process section 55.

The VITC-generating section 53 generates new VITC data 201 from the 30-frame rate time code, the 24-frame rate time code and the sequence number. The 30-frame rate time code TC 30F is described in the bit areas 205-1, 205-2, 205-3, 207-1, 207-2, 209-1, 209-2, 211-1 and 211-2 that conform to the SMPTE-12M standards. The 24-frame rate time code TC 24F is described in the user bit areas 213-1, 213-2, 213-3, 213-4, 213-5, 213-6, 213-7 and 213-8. The 4-bit data "d0:d1:d2:d3" is inserted into the user bit areas 220-1, 220-2 and 220-3.

The VITC-inserting section 59 inserts the VITC data 201 supplied from the VITC-generating section 53, into the blanking part of the top field t1' of the 30 frame-rate video signal output from the down-converting section 57.

How the bottom field b1 is processed will be described below.

Upon receiving the bottom field b1, i.e., the field of the 24-frame rate, source video signal S1, the pull-down process section 55 outputs this bottom field b1 as the bottom field b1 of the 30-frame rate video signal S5 (Step 1111). The pull-down process section 55 outputs a sequence number "3" to the VITC-generating section 53, because the bottom field b1' is the fourth field in the sequence of the pull-down process.

The VITC-generating section 53 generates new VITC data 201 to be inserted into the 30-frame rate, SD video signal (Step 1112). More precisely, a 24-frame rate time code TC 24F is extracted from the VITC data 151 superposed on the 24-frame rate, source video signal, in the same manner the top fields t0 and t1 are extracted. The time code of the bottom field b1, extracted, is "00:00:00:01" in the present embodiment.

The VITC-generating section 53 generates a 30-frame rate time code TC 30F. The 30-frame rate time code TC 30F, extracted, is "00:00:00:01" in this embodiment.

The VITC-generating section 53 generates 4-bit data "0:0:1:1" representing the sequence number "3" supplied from the pull-down process section 55.

The VITC-generating section 53 generates new VITC data 201 from the 30-frame rate time code, the 24-frame rate time code and the sequence number, in the same way as in the process performed on the top field and the bottom field, both described above.

The VITC-inserting section 59 inserts the VICT data 201 output from the VITC-generating section 53, into the blanking part of the bottom field b1' of the 30 frame-rate video signal output from the down-converting section 57.

The pull-down process section 55 outputs the top field t1 stored in the memory to generate a repeated field. The top field t1 is output as the top field t2' of he 30-frame rate video signal S5, whereby a repeated field is generated (Step 1113). The top field t2', or the repeated field, is a signal identical to the top field t1'. The pull-down process section 55 outputs a sequence number "5" to the VITC-generating section 53. This is because the top field t2' is the fifth field in the sequence of the pull-down process.

The VITC-generating section 53 generates new VITC data 201 to be inserted into the 30-frame rate, SD video signal (Step 1114). As indicated above, the 24-frame rate time code of the top field t1 is "00:00:00:01." The VITC-generating section 53 further generates a 30-frame rate time code TC 30F. The top field t2' constitutes the third frame F2' in the present embodiment. The 30-frame rate time code is, therefore, "00:00:00:02" as is illustrated in FIG. 15. That is, the 24-frame rate time code 30 and the 30-frame rate time code, both pertaining to the top field t2', are different.

The VITC-generating section 53 generates 4-bit data "0:1:0:0", too. This 4-bit data represents the sequence number "4" supplied from the pull-down process section 55.

The VITC-generating section 53 generates new VITC data 201 from the 30-frame rate time code, the 24-frame rate time code and the sequence number, in the same manner as in the process performed on the top field and the bottom field, both described above.

The VITC-inserting section 59 inserts the VITC data 201 output from the VITC-generating section 53, into the blanking part of the top field t2' of the 30 frame-rate video signal that has been output from the down-converting section 57.

How the top field t2 and the bottom field 2*b* are processed will now be described.

Upon receiving the top field t2, i.e., the field of the 24-frame rate, source video signal S1, the pull-down process section 55 outputs this top field t2 as the field of the 24-frame rate source video signal S1. The top field t2 is temporarily stored in the memory (Step 1116).

Next, when pull-down process section 55 receives the bottom field b2 of the 24-frame rate, source video signal S1, it outputs the bottom field b2 as the bottom field b2' of the 30-frame rate video signal S5 (Step 1117). The bottom field b2' is the sixth field in the sequence of the pull-down process. Therefore, the pull-down process section 55 outputs a sequence number "5" to the VITC-generating section 53.

The VITC-generating section 53 generates new VITC data 201 to be inserted into the 30-frame rate SD signal (Step 1118). More specifically, the 24-frame rate time code of the bottom field b2 in the 24-frame rate source video signal is "00:00:00:02." The bottom field b2' constitutes the third frame F2' in the present embodiment. The 30-frame rate time code is, therefore, "00:00:00:02" as is illustrated in FIG. 15. The VITC-generating section 53 generates 4-bit data "0:1:0:1", too, which represents a sequence number "5" supplied from the pull-down process section 55.

The VITC-generating section 53 generates new VITC data 201 from the 30-frame rate time code, the 24-frame rate time code and the sequence number, in the same manner as in the process performed on the top field and the bottom field, both described above.

The VITC-inserting sections 59 inserts the VITC data 201 output from the VITC-generating section 53, into the blanking part of the bottom field b2' of the 30-frame rate video signal output from the down-converting section 57.

Next, the pull-down process section 55 extracts the top field t2 from the top field t2 from the memory and outputs the top field t2 as the top field t3' of the 30-frame rate video signal S5 (Step 1119). The top field t3' is the seventh field of the sequence of the pull-down process. Hence, the pull-down process section 55 generates a sequence number "6" identifies the seventh field. This sequence number is output to the VITC-generating section 53.

The VITC-generating section 53 generates new VITC data 201 that is to be inserted into the 30-frame rate, SD video signal (Step 1120). In this embodiment, the 24-frame rate time code of the top field t2 of the 24-frame rate source video signal is "00:00:00:02," and the top field t3' constitute the fourth frame F3'. Therefore, the 30-frame rate time code is "00:00:00:03," as is illustrated in FIG. 15. The VITC-generating section 53 generates 4-bit data "0:1:1:1" that represents the sequence number "6" supplied from the pull-down process section 55.

The VITC-generating section 53 generates new VITC data 201 from the 30-frame rate time code, the 24-frame rate time code and the sequence number, in the same manner as in the process performed on the top field and the bottom field, both described above.

The VITC-inserting section 59 inserts the VICT data 201 output from the VITC-generating section 53, into the blanking part of the top field t3' of the 30 frame-rate video signal output from the down-converting section 57.

How the top field t3 and the bottom field b3 are processed will be explained below.

Upon receiving the top field t3 of the 24-frame rate, source video signal S1, the pull-down process section 55 stores this top field t3 into the memory (Step 1121). When the pull-down process section 55 receives the bottom field b3 of the 24-frame rate source video signal S1, the memory temporarily stores the bottom field b3 (Step 1122). Then, the pull-down process section 55 outputs the bottom field b3 of the 24-frame rate source video signal, as the bottom field b3' of the 30-frame rate video signal S5 (Step 1123). The bottom field b3' is the eighth field of the sequence of the pull-down process. The pull-down process section 55 therefore generates a sequence number "7" that identifies the eighth field. The sequence number "7" is output to the VITC-generating section 53.

The VITC-generating section 53 generates new VITC data 201 that is to be inserted into the 30-frame rate, SD video signal (Step 1124). In the present embodiment, the 24-frame rate time code of the bottom field b3 of the 24-frame rate source video signal is "00:00:00:03," and the bottom field b3' constitute the fourth frame F3'. Therefore, the 30-frame rate time code is "00:00:00:03," as is illustrated in FIG. 15. The VITC-generating section 53 generates 4-bit data "1:0:0:0" that represents the sequence number "7" supplied from the pull-down process section 55. The VITC-generating section 53 generates new VITC data 201 from the 30-frame rate time code, the 24-frame rate time code and the sequence number, in the same manner as in the process performed on the top field and the bottom field, both described above.

The VITC-inserting section 59 inserts the VITC data 201 output from the VITC-generating section 53, into the blanking part of the bottom field b3' of the 30 frame-rate video signal output from the down-converting section 57.

The pull-down process section 55 reads the top field t3 from the memory and outputs it as the top field t4' of the 30-frame rate video signal S5 (Step 1125). Since the top field t4' is the ninth field of the sequence of the pull-down process, the pull-down process section 55 generates a sequence number "8" identifies the ninth field. This sequence number is output to the VITC-generating section 53.

The VITC-generating section 53 generates new VITC data 201 that is to be inserted into the 30-frame rate, SD video signal (Step 1126). In this embodiment, the 24-frame rate time code of the top field t3 of the 24-frame rate source video signal is "00:00:00:03," and the top field t4' constitute the fifth frame F4'. Therefore, the 30-frame rate time code is "00:00:00:04," as is illustrated in FIG. 15. The VITC-generating section 53 generates 4-bit data "1:0:0:1" that represents the sequence number "8" supplied from the pull-down process section 55.

The VITC-generating section 53 generates new VITC data 201 from the 30-frame rate time code, the 24-frame rate time code and the sequence number, in the same way as in the process performed on the top field and the bottom field, both described above.

The VITC-inserting section 59 inserts the VITC data 201 output from the VITC-generating section 53, into the blanking part of the top field t4' of the 30 frame-rate video signal output from the down-converting section 57.

The pull-down process section 55 reads the bottom field b3 from the memory and outputs it as the bottom field b4' of the video signal S5 (Step 1127). The bottom field b4' is a repeated field, and is as same signal as the bottom field b3'. Since the bottom field b4' is the tenth field of the sequence of the pull-down process, the pull-down process section 55 generates a sequence number "9" identifies the tenth field. This sequence number is output to the VITC-generating section 53.

The VITC-generating section 53 generates new VITC data 201 that is to be inserted into the 30-frame rate, SD video signal (Step 1128). In this embodiment, the 24-frame rate time code of the bottom field b3 of the 24-frame rate source video signal is "00:00:00:03," and the bottom field b4' constitute the fifth frame F4'. Therefore, the 30-frame rate time code is "00:00:00:04," as is illustrated in FIG. 15. The VITC-generating section 53 generates 4-bit data "1:0:1:0" that represents the sequence number "9" supplied from the pull-down process section 55.

The VITC-generating section 53 generates new VITC data 201 from the 30-frame rate time code, the 24-frame rate time code and the sequence number, in the same way as in the process performed on the top field and the bottom field, both described above.

The VITC-inserting section 59 inserts the VITC data 201 output from the VITC-generating section 53, into the blanking part of the bottom field b4' of the 30 frame-rate video signal output from the down-converting section 57.

Thus, the rate conversion completes for one sequence of pull-down process (or for four frames). Thereafter, the sequence will be repeated.

In summary, the sequence of the 2-3 pull-down process that the pull-down process section 55 performs is an ordinary technique known in the art. It is not a characterizing feature of the present invention. The invention is not characterized in that not only a 30-frame rate time code (TC 30F), but also a 24-frame rate time code (TC 24F) added to the 24-frame rate, original source video data is described as VITC data in accordance with the SMPTE-12M standards, in order to generate a 30-frame rate video signal from a 24-frame rate video signal by means of the 2-3 pull-down process.

More specifically, the 30-frame rate time code is described in the bit areas 205-1, 205-2, 205-3, 207-1, 207-2, 209-1, 209-2, 211-1 and 211-2 that accord with the SMPTE-12M standards, as in ordinary video signals. By contrast, the 24-frame rate time code TC 24F added to the 24-frame rate, original source HD video signal is described in the user bit areas 213-1, 213-2, 213-3, 213-4, 213-5, 213-6, 213-7 and 213-8. This makes it possible to transmits the original time code data of 24-frame rate, along with the vide data of 30-frame rate. Additionally, the original time code is not eliminated even if the 2-3 pull-down process is performed on the 24-frame rate video data, converting the same to 30-frame rate video data.

The present invention is further characterized in that the sequence number indicating the position any field takes in the sequence of the pull-down process is inserted in the user area of the VITC data. This measure makes it possible to effect the inverse 2-3 pull-down process (later described) reliably at high speed, without using a special algorithm.

The videotape recorder 7 processes the 24-frame rate HD video signal S3 output from the video camera 5, in the same way as it processes the video signal S1. The videotape recorder 7 generates and outputs a 30-frame rate SD video signal for performing off-line edition.

The videotape recorder 13 receives the 30-frame rate SD video signal S5 from the videotape recorder 7 and records the same on videotape 15 of the VHS format.

The videotape recorder 17 playbacks the VHS videotape 15, reproducing the 30-frame rate SD video signal. The 30-frame rate SD video signal, thus reproduced, is supplied to the nonlinear editing device 19.

[Digitizing in Nonlinear Editing Device 19]

The digitizing process performed in the nonlinear editing device 19 will be explained below. The term "digitizing process" generally means the process of converting video materials into digital data. In the field of data editing, the term is used to mean the process of recording the video material (i.e., data on videotape) on a recording medium that can be randomly accessed.

The nonlinear editing device 19 performs inverse 2-3 pull-down process to carry out the digitizing process. The inverse 2-3 pull-down process is inverse to the 2-3 pull-down process; it converts a 30-frame rate video signal to a 24-frame rate video signal. The nonlinear editing device 19 of this embodiment receives the 30-frame rate SD video signal from the videotape recorder 17 and performs the inverse 2-3 pull-down process on the SD video signal, converting the SD video signal to a 24-frame rate SD video signal. The 24-frame rate SD video signal is recorded on the hard disc 18.

Figure 22:
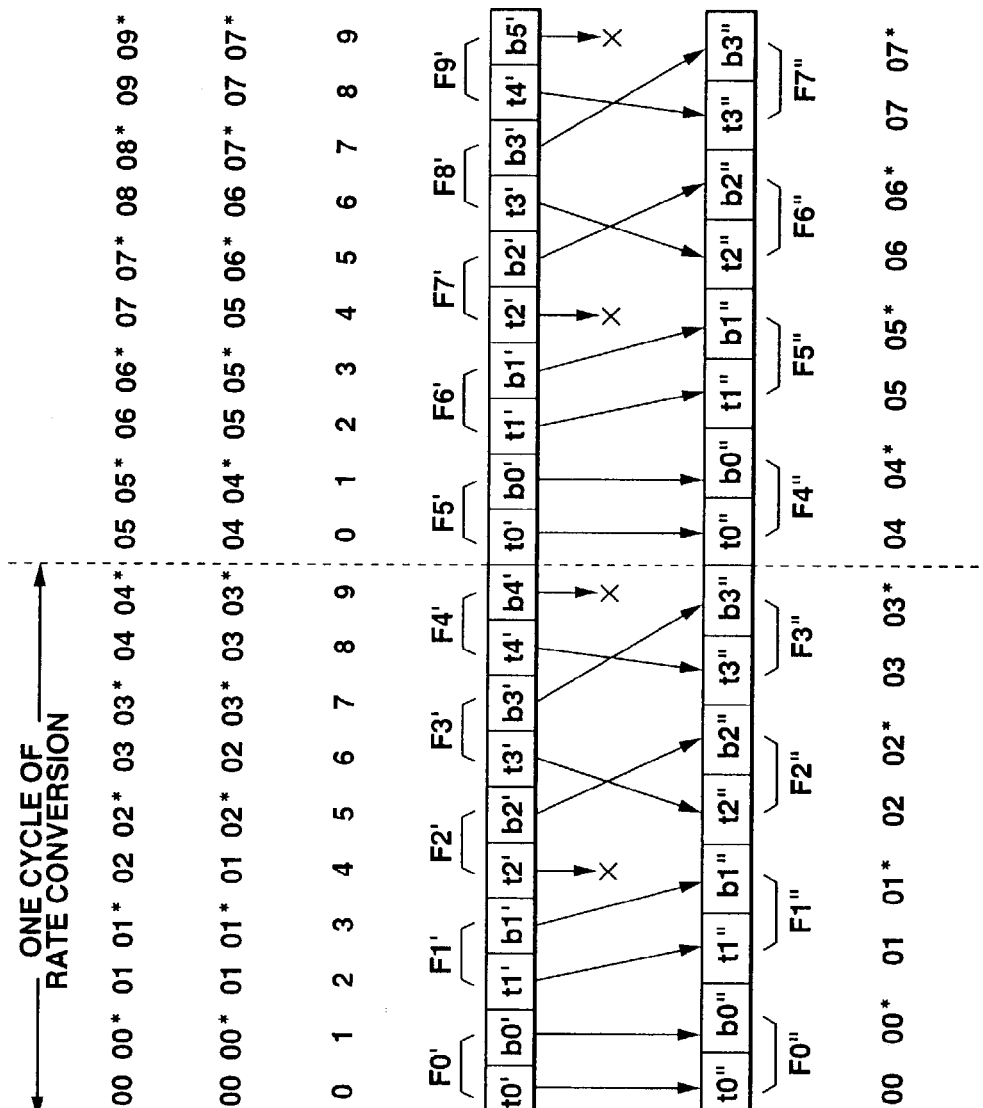
FIG. 22 is a chart explaining an inverse 2-3 pull-down process.

The digitizing process, which that the nonlinear editing device 19 performs, will be described in detail, with reference to the flowchart of FIGS. 16 to 23 and the inverse 2-3 pull-down conversion diagram of FIG. 22. The process that will be explained below is effected by the computer 20 incorporated in the nonlinear editing device 19.

First, the digitizing process on fields t0', b0', t1' and b1' will be described below.

The computer 20 extracts the VITC data 201 for each field, from the blanking part of the 30-frame rate SD video signal S5 that has been output from the videotape recorder 17 (Step 1701).

The computer 20 extracts the sequence number 301 from the VITC data 201 that has been extracted in Step 1701 (Step 1702). The 4-bit data representing the sequence number 301 is described in the user bit areas 220-1, 220-2 and 220-3 of the VITC data 201, as has been indicated before. The sequence number can be obtained by referring to these bit areas.

Then, the computer 20 extracts the 24-frame rate time code from the VITC data 201 thus extracted (Step 1703). The 24-frame rate time code is described in the user bit areas 213-1, 213-2, 213-3, 213-4, 213-5, 213-6, 213-7 and 213-8, as has been pointed out above. Hence, it can be easily extracted by referring to the data recorded in these bit areas.

The sequence number 301 may be "0," "1" "2" or "3." If this is the case, the fields t0', b0', t1' and b1' of the 30-frame rate video signal S5 will be recorded on the hard disc 18, in the order mentioned, as the fields t0", b0", t1" and b1" of the 24-frame rate SD video signal (Step 1705).

The computer 20 may incorporate a memory that stores a table showing the relation between the time codes of the fields and the logic addresses on the hard disc, at which the fields are recorded. The computer 20 uses the table stored in the memory, whereby the 24-frame rate time codes extracted from the user bit areas in Step 1703 may be recorded in association with the logic addresses. Since the time codes are recorded in association with the logic addresses, the editor-operator can quickly access any desired field or frame, merely by designating the time code associated with the field or frame.

The digitizing process on fields t2' and b4' will be described below.

In Step 1704, the sequence number 301 may be "4," not ""0," "2" or "3" (Step 1707). If so, the field t2' is not written onto the hard disc 18 (Step 1708). This is because the fields t2' and b4' are repeated fields, or redundant fields, which have been added through the 2-3 pull-down process.

In the present invention, it is determined whether these fields are repeated fields, from the sequence number 301. This makes it possible to remove repeated fields reliably at high speed. The reason why will be described below.

Application WO 00/13418, which the assignee of the present application has filed, discloses an ordinary method of detecting repeated fields from 30-frame rate video data that has been generated by the 2-3 pull-down process. In the method, the two fields, respectively preceding and following each field, are compared, finding the difference between them. If the difference is nearly equal to "0," the field is regarded as a repeated field. In this method, however, subtraction must be carried out on all fields. The method requires a memory of a large storage capacity and a special algorithm. The circuit that performs the inverse 2-3 pull-down process needs to be massive and, hence, very expensive. As indicated in Application WO 00/13418, this method cannot be said to be reliable. It may make errors in detecting repeated fields.

In the present invention, the sequence number 301 of any repeated field is unique to the repeated field. Special operations, such as the subtraction effected to find a difference between fields, need not be carried out. The use of sequence numbers solves the above-discussed problem, detecting repeated fields easily and quickly.

The digitizing process on the bottom field b2' will be described below.

If the sequence number 301 is "5" (Step 1709), the bottom field b2' of the 24-frame rate video signal S5 is recorded on the hard disc 18 as the bottom field b2" of the 24-frame rate video signal S7 (Step 1710). The position on the hard disc 18, at which the bottom field b2" is recorded, is the physical position next to the position at which the following top field t2" shall be recorded. Otherwise, the frame cannot be continuously accessed.

Then, the personal computer 20 stores the 24-frame rate time code "00:00:00:02" of the bottom field b2" at that address in the internal memory which is associated with the logic address of the bottom field b2," which exists on the hard disc (Step 1711).

The digitizing process on the top field t3' will be described below.

If the sequence number 301 is "6" (Step 1712), the top field t3' is recorded on the hard disc 18 as the top field t2" of the 24-frame rate video signal S7 (Step 1713). The logic address on the hard disc, at which the top field t2" is recorded, is the physical position that follows the bottom field b1" and precedes the bottom field b2".

The personal computer 20 stores the 24-frame rate time code "00:00:00:02" of the top field t2" at that address in the internal memory which is associated with the logic address of the top field t2," which exists on the hard disc (Step 1714).

Steps 1709 to 1714 thus performed, the bottom field b2' of the 30-frame rate video signal S5 is recorded at the position of the bottom field b2" of the 24-frame rate video signal S7. And the top field t3' of the video signal S5 is recorded at the position of the top field t2' of the video signal S7. As a result of this, the fields t2" and b2" exist in this order in the 24-frame rate video signal S7 obtained by the inverse pull-down process, while the fields b2' and t3' remain in this order in the 30-frame rate video signal S5.

The digitizing process on the bottom field b3 will be described below.

If the sequence number 301 is "7", the bottom field b3' is recorded on the hard disc 18 as the bottom field b3" of the video signal S7 (Step 1716). The position on the hard disc, at which the bottom field b3' is recorded, is the physical position next to the position at which the following top field t3" shall be recorded. Otherwise, the frame cannot be continuously accessed.

The personal computer 20 stores the 24-frame rate time code "00:00:00:03" of the bottom field b3" at that address in the internal memory which is associated with the logic address of the bottom field b3," which exists on the hard disc (Step 1717). The digitizing process on the top field t4' will be described below.

If the sequence number 301 is "8", the top field t4' is recorded on the hard disc 18 as the top field t3" of the video signal S7 (Step 1719). The logic address on the hard disc 18, at which the top field t3" is recorded, is the physical position that follows the bottom field b2" and precedes position where the bottom field b3" shall be recorded.

Then, the personal computer 20 stores the 24-frame rate time code "00:00:00:03" of the top field t3" at that address in the internal memory which is associated with the logic address of the top field t3," which exists on the hard disc (Step 1720).

Steps 1715 to 1720 thus performed, the bottom field b3' of the 30-frame rate video signal S5 is recorded at the position of the bottom field b3" of the 24-frame rate video signal S7. And the top field t4' of the video signal S5 is recorded at the position of the top field t3' of the video signal S7. As a result of this, the top field t3" and the bottom field b3" exist in this order in the 24-frame rate video signal S7 obtained by the inverse pull-down process, while the bottom field b3' and top field t4' remain in this order in the 30-frame rate video signal S5.

The digitizing process on the bottom field b4' will be explained below.

The sequence number of the bottom field b4' is "9." Hence, the control of writing the bottom field b4' onto the hard disc 18 is not performed, as has been indicated above.

Thus, one cycle of inverse pull-down rate conversion completes. When the inverse pull-down rate conversion is repeated, the 24-frame rate SD video signal will be recorded on the hard disc 18.

To summarize the foregoing, the present invention is characterized in the following respects.

Inverse 2-3 pull-down process is performed on a 30-frame rate video signal output from a videotape recorder, thus converting the same to a 24-frame rate video signal, in order to record the 30-frame rate video signal on a hard disc. In the course of generating the 24-frame rate video signal by means of the inverse 2-3 pull-down process, the sequence number, or VITC data, is extracted from the blanking part of each field of the 30-frame rate video signal. In accordance with the sequence number thus extracted, a prescribed process is performed on each field. The prescribed process is unique, determined by the sequence number 301, as has been explained above.

Further, the 24-frame rate time code, which is associated with the 24-frame rate video data generated through the inverse 2-3 pull-down process, can be extracted from the data described in the user bit areas of he VITC data of the 30-frame rate video signal. This is another characterizing feature of the present invention.

When the process described above is carried out, the 24-frame rate video signal S7, free of the repeated fields t2' and b4' contained in the 30-frame rate SD video signal S5, is recorded on the hard disc 18. The order in which the fields are arranged in the 24-frame rate SD video signal S7 is exactly the same as in the original source video signal S1. Nonetheless, the 24-frame rate SD video signal differs from the video signal S1 in terms of resolution.

After the nonlinear editing device 19 finishes the digitizing process, the editor-operator performs off-line edition. When the editor-operator operates the GUI shown on the display of the personal computer 20, the 24-frame rate time code stored in the memory provided in the computer 20 and the logic address of the frame, which are associated with the time code, are referred to. Access is thereby made to the 24-frame rate digital video signal that is recorded on the hard disc. If the editor-operator performs edition, setting in-points and out-points, a 24-frame rate, edition list (EDL) 21 will be prepared.

The edition list 21 is a list based on 24-frame rate time codes. It is an edition list that will be used in on-line edition in the course of producing a master video program.

FIG. 23 shows an example of an edition list 21. This edition list 21 is designed to extract video scenes that accord with an edition point, from the videotape 9 and the videotape 11, thereby to generate a master videotape 30.

The edition list 21 describes the time codes (IN) 71 for in-points, the time codes (OUT) 73 for out-points, the tape types 75, and the like. In FIG. 23, A-1, A-2, . . . indicate the areas on the videotape. In the case of the master videotape 30, the areas A-1, A-2, A-3, . . . are recorded in this order they are mentioned.

The area A-1 relates to the videotape 9 and corresponds to a frame that starts at 2 minute, 00.10 second and ends at 5 minutes, 12.18 seconds.

The area A-2 relates to the videotape 9 and corresponds to a frame that starts at 8 minute, 30.02 second and ends at 10 minutes, 15.06 seconds.

The area A-3 relates to the videotape 11 and corresponds to a frame that starts at 3 minute, 15.10 second and ends at 7 minutes, 20.16 seconds.

These areas A-1, A-2, A-3, . . . are recorded on the master videotape, in the order they are mentioned.

The on-line editing system receives the 24-frame rate edition list 21. The editing apparatus 27 controls the playback timing of the videotape recorders 23 and 25 in accordance with the 24-frame rate edition list (EDL) 21. The editing apparatus 27 controls the record timing of the videotape recorder 29, too. As the result of the on-line edition, a master video program is recorded on the master videotape 30. The master video program accords with the edition list 21.

Figure 24:
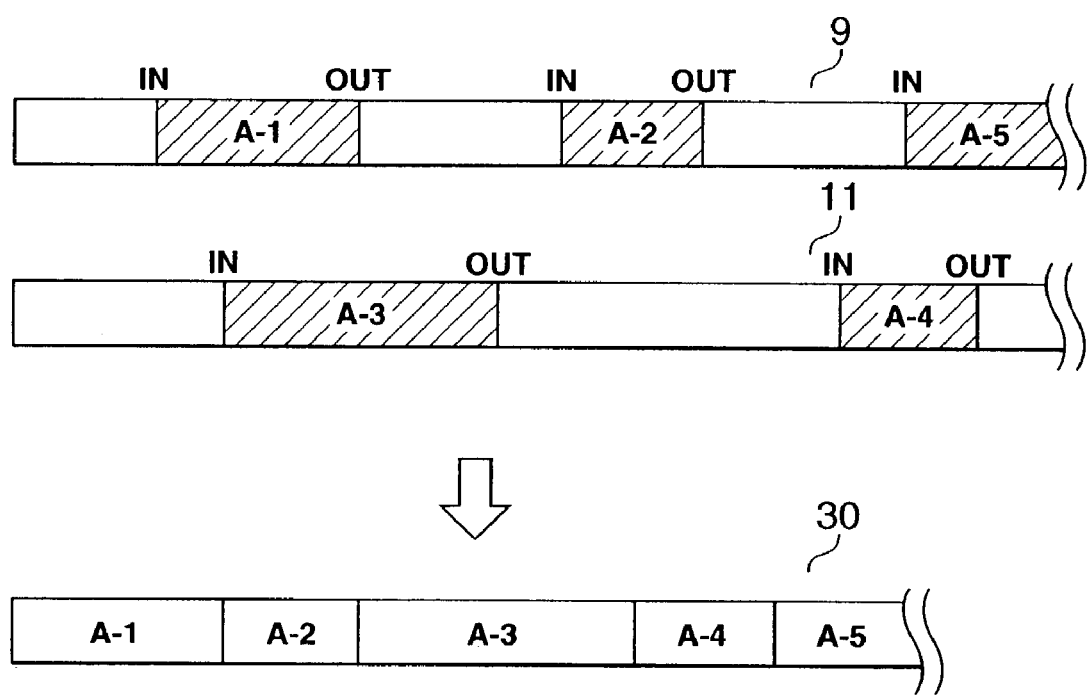
FIG. 24 is a diagram explaining how videotapes 9 and 11 are edited to prepare videotape 30.

FIG. 24 explains how videotape 9 and the videotape 11 are edited to prepare the videotape 30.

The editing apparatus 27 gives a command to the videotape recorder 23 in accordance with the edition list 21, whereby the videotape recorder 23 reads data from the area A-1 of the videotape 9. The data recorded in the area A-1 is supplied to the videotape recorder 29. The videotape recorder 29 records the data recorded in the area A-1 of the videotape 9, on the master videotape 30.

Next, the editing apparatus 27 gives a command to the videotape recorder 23, whereby the videotape recorder 23 supplies the data recorded in the area A-2 to the videotape recorder 29. The videotape recorder 29 records the data recorded in the area A-2, on the master videotape 30.

Further, the editing apparatus 27 gives a command to the videotape recorder 25, whereby the videotape recorder 25 supplies the data recorded in the area A-3 to the videotape recorder 29. The videotape recorder 29 records the data recorded in the area A-3, on the master videotape 30.

Thus, the edition list 21 is used to edit the 24-frame rate video signals recorded on the videotapes 9 and 11 and record them on the master videotape 30.

In the present embodiment, the time codes of the video signal S1 (e.g., the frame data areas 105-1, 105-2, etc.) are written in the user areas 213-1, 213-2, etc. for the VITC data 201 of the video signal S5 in order to generate the 30-frame rate video signal S5 by means of the 2-3 pull-down process. Therefore, the VITC data 201 can identify the frame of the original video signal S1.

The sequence number 301 is inserted at the 39th bit, 59th bit, 72nd bit and 73rd bit that define a user bit area for the VITC data 201.

Hence, fields or the like can be quickly processed in the inverse 2-3 pull-down process, in accordance with the sequence number 301.

The sequence number 301 may be "4" or "9." In this case, no fields are written on the hard disc.

OTHER EMBODIMENTS

The present invention is not limited to the embodiment described above. Rather, various modifications can be made. In the embodiment, the rate converter 43 incorporated in the videotape recorder 7 converts the frame rate. Nonetheless, a rate converter provided outside the videotape recorder 7 may be used to convert the frame rate.

The embodiment described above performs conversion between a 24-frame rate video signal and a 30-frame rate video signal. Nevertheless, the present invention can perform rate conversion on any other types of video signals. Needless to say, 24-frame rate video signals can be converted to 60-frame rate signals, 25-frame rate signals, 50-frame rate signals, or the like.

In the embodiment described above, the time code and sequence number of the video signal S1 is written in the user area of the VITC data 201 of the video siganl S5 before the video signal S1 is converted in terms of frame rate. Instead, only the time code or the sequence number may be written in the user area.

In the embodiment described above, the time code and the like are written in the user area of the VITC data. An LTC (Longitudinal Time Code) may be written in the user area of the VITC data.

The invention claimed is:

1. A video signal processing apparatus comprising:
   signal-generating means for converting a frame rate of a source video signal, thereby generating a destination video signal;
   and data-inserting means for inserting a time code of the source video signal into the destination video signal,
   where the source time code and frame numbers of said source video signal are stored in a user area of Vertical Interval Time Code (VITC) data in the destination video signal.

2. The video signal processing apparatus according to claim 1, further comprising second data-inserting means for inserting a sequence number into the second video signal, said sequence number indicating the order in which fields exist in the second video signal.

3. The video signal processing apparatus according to claim 2, wherein the second data-inserting means inserts the sequence number into the user area of VITC data contained in the second video signal.

4. A video signal processing apparatus comprising:
   data-extracting means for extracting a sequence number from a source video signal containing the sequence number that indicates the order in which fields exist in the source video signal; and
   data-generating means for processing the fields of the source video signal in accordance with the sequence number extracted by the data-extracting means, thereby generating a destination video signals,
   where the sequence number of said source video signal is stored in a user area of Vertical Interval Time Code (VITC) data in the destination video signal.

5. A video data processing apparatus designed to perform signal processing on source video data, said apparatus comprising:
   means for converting 24-frame rate source video data to 30-frame rate video data by means of 2-3 pull-down process; and
   means for storing a 30-frame rate time code corresponding to the 30-frame frame video data, as Vertical Interval Time Code (VITC) data and storing a 24-frame rate time code corresponding to the 24-frame rate source video data, in a user bit area of the VITC data.

6. A video data processing apparatus designed to perform signal processing on source video data, said apparatus comprising:
   means for converting 24-frame rate source video data to 30-frame rate video data by means of 2-3 pull-down process; and
   means for storing a 30-frame rate time code corresponding to the 30-frame rate video data, as Vertical Interval Time Code (VITC), in a bit area that accords with SMPTE-12M standards, and storing, in a user bit area of said VITC data, a 24-frame rate time code corresponding to the 24-frame rate source video data and a sequence number indicating the order in which fields are processed in one sequence of the 2-3 pull-down process.

7. A video data editing apparatus for editing video data, said apparatus comprising:
   means for receiving 30-frame rate video data generated by performing 2-3 pull-down process on 24-frame rate source video data;
   data-extracting means for extracting a time code corresponding to the 24-frame rate source video data inserted in a user bit area of the VITC data contained in the 30-frame rate video data; and
   means for generating an edition list of 24-frame rate, for use in editing the 24-frame rate source video data in accordance with the 24-frame rate time code.

8. A video data editing apparatus for editing video data, said apparatus comprising:
   an on-line editing device for processing 24-frame rate video data; and an off-line editing device for processing 30-frame rate video data, wherein said off-line editing device comprises: means for receiving 30-frame rate video data generated by performing 2-3 pull-down process on 24-frame rate source video data; and
   means for generating an edition list of 24-frame rate, for use in editing the 24-frame rate source video data in accordance with the 24-frame rate time code which corresponds to the 24-frame rate source video data inserted in the user bit area of the VITC data contained in the 30-frame rate video data, and said on-line editing device comprises:
   means for editing the 24-frame rate source video data in accordance with the edition list of 24-frame rate.

9. A video data editing apparatus for editing 30-frame rate video data, said apparatus comprising:
   means for receiving 30-frame rate video data generated by performing 2-3 pull-down process on 24-frame rate source video data; and
   means for generating an edition list of 24-frame rate, for use in editing the 24-frame rate source video data in accordance with a 24-frame rate time code which corresponds to the 24-frame rate source video data inserted in the user bit area of the VITC data contained in the 30-frame rate video data.

10. A video data editing apparatus for editing video data, said apparatus comprising:
    means for receiving 30-frame rate video data generated by performing 2-3 pull-down process on 24-frame rate source video data, said 30-frame rate video data containing a 30-frame rate time code described, as VITC data about the 30-frame rate video data, in a bit area that accords with SMPTE-12M standards, and a 24-frame rate time code corresponding to the 24-frame rate source video data and a sequence number indicating the order of fields in one sequence of the 2-3 pull-down process, both described in an user bit area of the VITC data of the 30-frame video data; and
    means for generating an edition list of 24-frame rate, for use in editing the 24-frame rate source video data in accordance with a 24-frame rate time code and sequence number.

11. A video data editing apparatus for editing video data, said apparatus comprising:
    means for receiving 30-frame rate video data generated by performing 2-3 pull-down process on 24-frame rate source video data, said 30-frame rate video data containing a 30-frame rate time code described, as VITC data about the 30-frame rate video data, in a bit area that accords with SMPTE-12M standards, and a 24-frame rate time code corresponding to the 24-frame rate source video data and a sequence number indicating the order of fields in one sequence of the 2-3 pull-down process, both described in an user bit area of the VITC data of the 30-frame rate video data;
    means for generating 24-frame rate video data, by performing inverse 2-3 pull-down process on the 30-frame rate video data in accordance with the sequence number,
    means for generating an edition list of 24-frame rate, by performing an off-line edition process using the 24-frame rate video data generated by means of the inverse 2-3 pull-down process and the 24-frame rate time code; and
    means for producing a master video program by performing on-line edition on the 24-frame rate source video data in accordance with the 24-frame rate edition list.

12. A video signal processing method comprising the steps of:
    converting a frame rate of a source video signal, thereby generating a destination video signal;
    and inserting a time code of the source video signal into the destination video signal, where the source time code and frame numbers of said source video signal are stored in a user area of Vertical Interval Time Code (VITC) data in the destination video signal.

13. The video signal processing method according to claim 12, wherein a sequence number that indicates the order in which the fields exist in the source video signal is inserted into the user area of Vertical Interval Time Code (VITC) data contained in the destination video signal.

14. A video signal processing method comprising the steps of:
extracting a sequence number from a source video signal containing the sequence number that indicates the order in which fields exist in the source video signal; and
processing the fields of the source video signal in accordance with the sequence number extracted by the data-extracting means, thereby generating a destination video signal,
where the sequence number extracted from said source video signal is stored in a user area of Vertical Interval Time Code (VITC) data in the destination video signal.

15. A video data processing method designed to perform signal processing on source video data, comprising the steps of:
converting 24-frame rate source video data to 30-frame rate video data by means of 2-3 pull-down process; and
storing a 30-frame rate time code corresponding to the 30-frame rate video data, as Vertical Interval Time Code (VITC) data, and storing, in a user bit area of said VITC data, a 24-frame rate time code corresponding to the 24-frame rate source video data.

16. A video data processing method designed to perform signal processing on source video data, comprising the steps of:
converting 24-frame rate source video data to 30-frame rate video data by means of 2-3 pull-down process; and
storing a 30-frame rate time code correspondindg to the 30-frame rate video data as Vertical Interval Time Code (VITC) data, in a bit area that accords with SMPTE-12M standards, and storing, in a user bit area of said VITC data, a 24-frame rate time code corresponding to the 24-frame rate source video data and a sequence number indicating the order of fields in one sequence of the 2-3 pull-down process.

17. A video data editing method designed to edit video data, comprising the steps of:
receiving 30-frame rate video data generated by performing 2-3 pull-down process on 24-frame rate source video data;
extracting a time code corresponding to the 24-frame rate source video data inserted in a user bit area of the VITC data contained in the 30-frame rate video data; and
generating an edition list of 24-frame rate, for use in editing the 24-frame rate source video data in accordance with the 24-frame rate time code.

18. A video data editing method using an on-line editing device for processing 24-frame rate video data and an off-line editing device for processing 30-frame rate video data, wherein said off-line editing device receives 30-frame rate video data generated by performing 2-3 pull-down process on 24-frame rate source video data, and generates an edition list of 24-frame rate, for use in editing the 24-frame rate source video data in accordance with the 24-frame rate time code which corresponds to the 24-frame rate source video data inserted in the user bit area of the VITC data contained in the 30-frame rate video data; and said on-line editing device edits the 24-frame rate source video data in accordance with the edition list of 24-frame rate.

19. A video data editing method for processing 30-frame rate video data, comprising the steps of:
receiving 30-frame rate video data generated by performing 2-3 pull-down process on 24-frame rate source video data; and
generating an edition list of 24-frame rate, for use in editing the 24-frame rate source video data in accordance with a 24-frame rate time code which corresponds to the 24-frame rate source video data inserted in the user bit area of the VITC data contained in the 30-frame rate video data.

20. A video data editing method designed to edit video data, comprising the steps of:
receiving 30-frame rate video data generated by performing 2-3 pull-down process on 24-frame rate source video data, said 30-frame rate video data containing:
a 30-frame rate time code stored as Vertical Interval Time code (VITC) data, in a bit area that accords with SMPTE-12M standards, and
a 24-frame rate time code corresponding to the 24-frame rate source video data and a sequence number indicating the order of fields in one sequence of the 2-3 pull-down process, both stored in a user bit area of said VITC data of the 30-frame rate video data; and
generating an edition list of 24-frame rate, for use in editing the 24-frame rate source video data in accordance with a 24-frame rate time code and sequence number.

21. A video data editing method designed to edit video data, comprising the steps of:
receiving 30-frame rate video data generated by performing 2-3 pull-down process on 24-frame rate source video data, said 30-frame rate video data containing:
a 30-frame rate time code deee*ibed stored as Vertical Interval Time Code (VITC) data, in a bit area that accords with SMPTE-12M standards, and
a 24-frame rate time code corresponding to the 24-frame rate source video data and a sequence number indicating the order of fields in one sequence of the 2-3 pufl-down process, both stored in a user bit area of said VITC data of the 30-frame rate video data;
generating 24-frame rate video data, by perfoniting inverse 2-3 pull-down pmcess on the 30-frame rate video data in accordance with the sequence number;
generating an edition list of 24-frame rate, by performing an off-line edition process using the 24-frame rate video data generated by means of the inverse 2-3 pull-dowm process and the 24-frame rate time code; and
producing a master video program by performing on-line edition on the 24-frame rate source video data in accordance with the 24-frame rate edition list.

* * * * *